United States Patent [19]
Gjessing et al.

[11] Patent Number: 5,921,713
[45] Date of Patent: Jul. 13, 1999

[54] METHOD FOR CONNECTING UNDERWATER PIPELINES PARTICULARLY SUITABLE FOR GREAT DEPTHS AND BIG DIAMETERS

[75] Inventors: Harald Ottar Gjessing, Kongsberg, Norway; Guido d'Aloisio, Ancona, Italy; Giovanni Corbetta, Marotta, Italy; Alessandro Radicioni, Ancona, Italy; Finn Germand Haugen, Notodden, Norway

[73] Assignees: Kongsberg Offshore A.S, Kongsberg, Norway; Snamprogetti S.p.A., Milanese, Italy

[21] Appl. No.: 08/913,763
[22] PCT Filed: Mar. 14, 1996
[86] PCT No.: PCT/NO96/00058
  § 371 Date: Jan. 26, 1998
  § 102(e) Date: Jan. 26, 1998
[87] PCT Pub. No.: WO96/29532
  PCT Pub. Date: Sep. 26, 1996

[30] Foreign Application Priority Data

Mar. 23, 1995 [IT] Italy .................................. MI95A0579

[51] Int. Cl.$^6$ ......................................................... F16L 1/04
[52] U.S. Cl. .......................... 405/170; 405/158; 405/171
[58] Field of Search ........................ 405/158, 169–173, 405/159, 154

[56] References Cited

U.S. PATENT DOCUMENTS

| 3,524,325 | 8/1970 | Brown . |
| 4,075,862 | 2/1978 | Ames . |
| 4,234,268 | 11/1980 | Scodino ............................... 405/173 X |
| 4,253,779 | 3/1981 | Grognu ............................... 405/170 X |
| 4,436,449 | 3/1984 | Smoot et al. ....................... 405/158 X |
| 4,591,293 | 5/1986 | Levallois et al. ....................... 405/170 |
| 4,832,530 | 5/1989 | Andersen et al. ....................... 405/170 |

FOREIGN PATENT DOCUMENTS

932563 1/1995 Norway .

*Primary Examiner*—Dennis L. Taylor
*Attorney, Agent, or Firm*—Young & Thompson

[57] ABSTRACT

A method of connecting underwater pipelines by installation of a pipeline on a seabed fixed frame; laying of an outboard pipeline by a lay barge; installation of a subsea winch with the frame; actuation of the winch by a ROV to unwind the cable of the winch, aided by another ROV bringing and connecting the end of the cable to the outboard pipeline; winding of the cable and following deflection of the outboard pipeline up to the frame; installation of a metrology system to define the distance and angular misalignment between the two pipelines' ends to be connected; assembly of a connection system with telescopic capabilities using the measurements of the metrology system and using a dedicated frame installed on board a support ship; installation of the connection system on the seabed fixed frame and connection of the connection system with the pipeline ends.

27 Claims, 34 Drawing Sheets

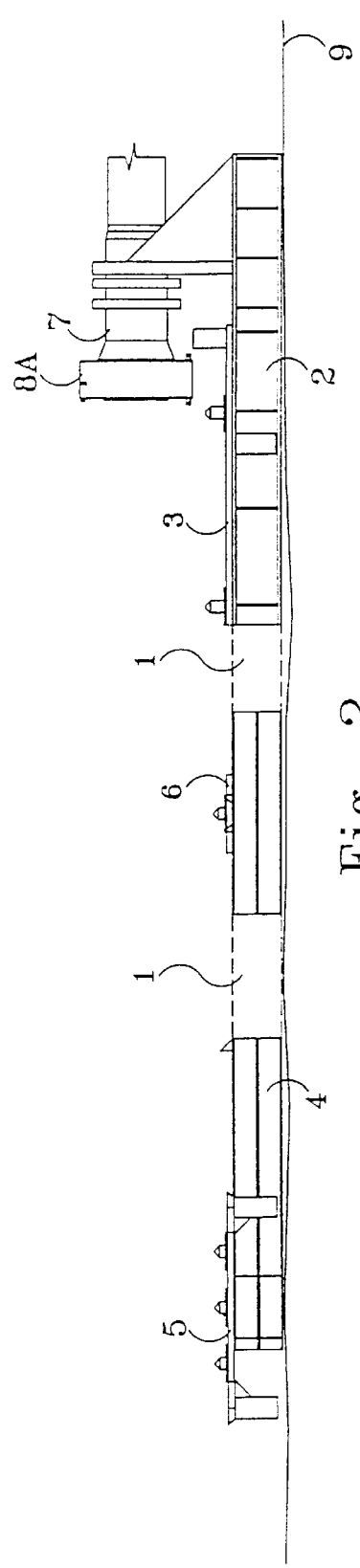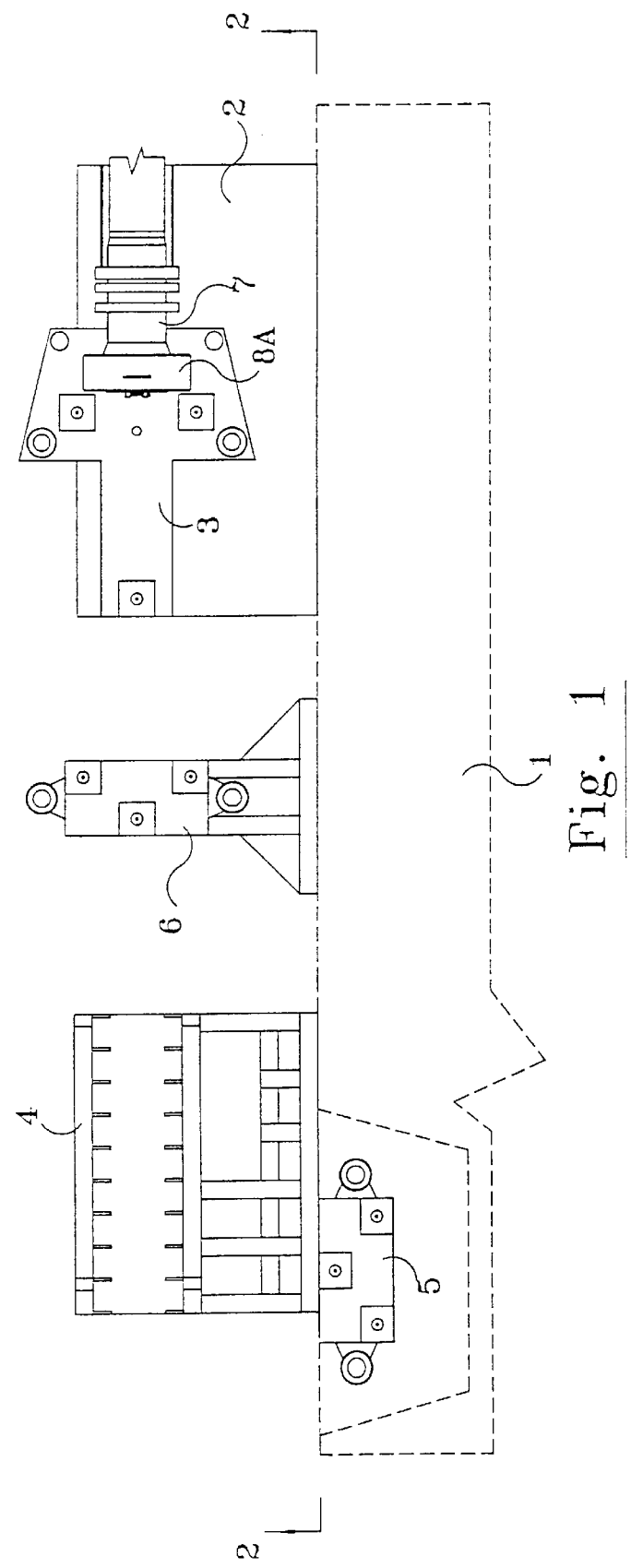

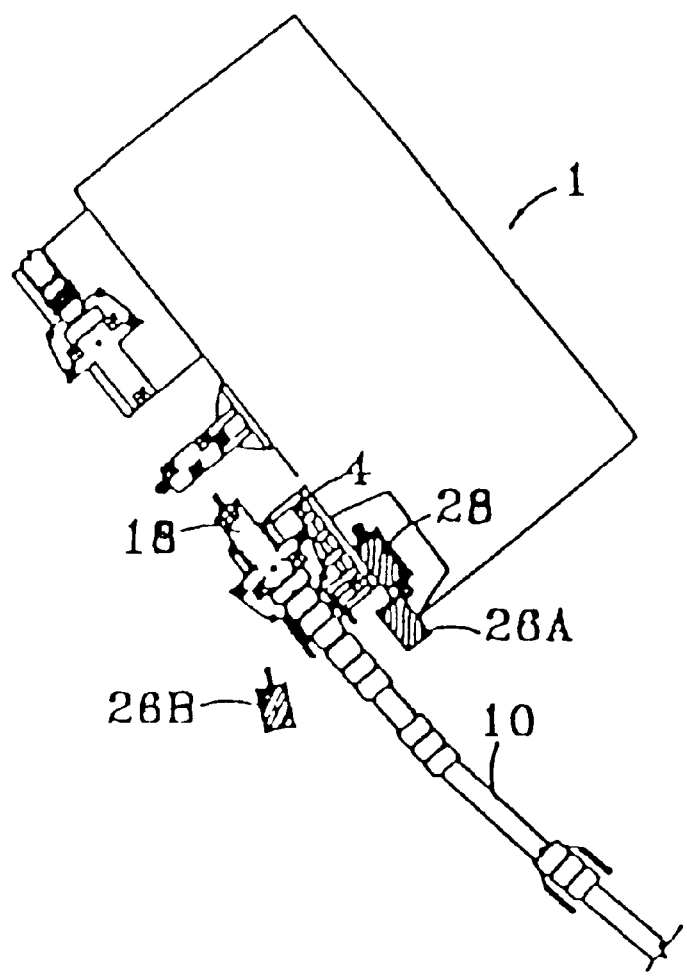
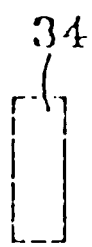
Fig. 14

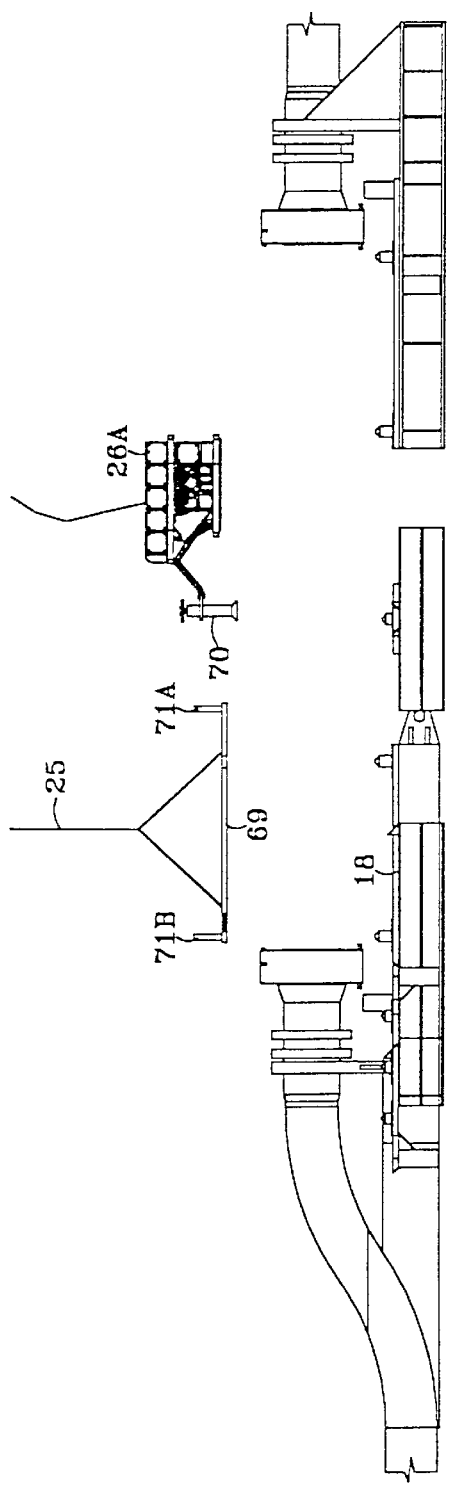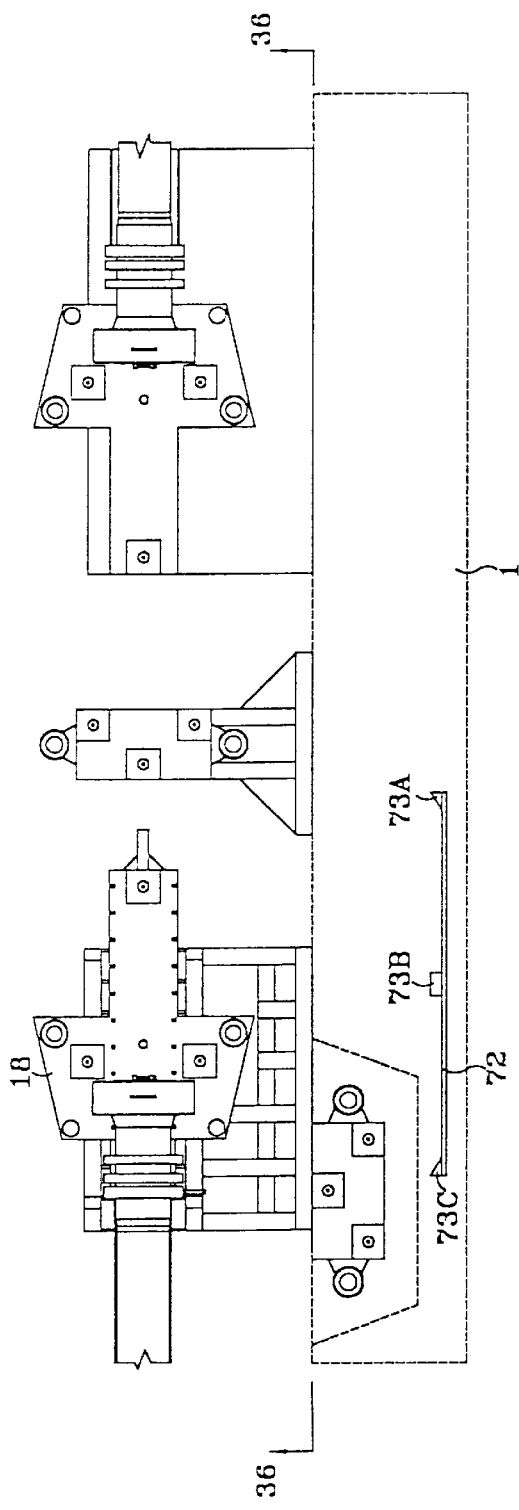

METHOD FOR CONNECTING UNDERWATER PIPELINES PARTICULARLY SUITABLE FOR GREAT DEPTHS AND BIG DIAMETERS

BACKGROUND OF THE INVENTION

The invention relates to a new method by which, in situ and without the use of divers or other personnel operating at depth, two underwater pipelines, with diameters up to 40" and also over, can be connected, particularly suitable for great depths and big diameters.

DESCRIPTION OF THE RELATED ART

Various methods are already known in the art for connecting underwater pipelines. Apart from the one used for low and medium depths, based on hyperbaric welding requiring the use of immersed personnel, which can be effected satisfactorily to a maximum depth of the order to 200 meters both because of problems involved in the welding itself and because of problems concerning the operating capacity of the personnel, which is considerably reduced under the excessive external pressure, the other methods used for such connection intervention, based on system not requiring the use of immersed personnel, are mainly limited by two principal factors: pipeline diameter and water depth.

Pipeline diameter can be considered the main limiting parameter, in fact all the known methods in the state of the art require one of the two pipeline sections to be connected to be able to be pulled up to the other section being fixed. The pull forces required for this operation increase proportionally with the pipeline diameter and operations with these characteristics have been performed only for pipeline up to 20".

Water depth, instead, is a critical parameter due to the fact that all the known methods in the state of the art require a guidance apparatus from surface to seabed to the aid their installation on the seabed. Such guidance apparatus is composed by steel guide lines connected on one side to the seabed structure, while on the other side to the ship used as support on surface. This guidance method, at the moment, is considered satisfactory up to a depth of the order of 400 meters because of problems involved in the tensioning of said guide lines. Because of this, there is a need for an alternative method able to overcome both the pipeline diameter and depth barriers while ensuring the same operating reliability of the existing systems.

The closest prior art is NO-A-932563, which discloses a method for connecting underwater pipelines, whereby one of the pipeline sections to be connected is pulled up to the other section. However, the pulling forces for such an operation are very large and can only be carried out for smaller pipelines.

SUMMARY OF THE INVENTION

The object of the present invention is to obviate said drawbacks by providing a method allowing a complete remote connection of underwater pipelines, not requiring any pull operation to one of the two pipeline sections to be connected, and not requiring the use of guide lines for its installation on the seabed, to be performed by a ship with a simple crane.

The present invention solves the problem outlined above through the use of a mechanical joint, formed by connectors, provided with telescopic capacity avoiding any pull requirement for both sections of the pipeline, and through the use as installation aid in the preferred embodiment of a guidance system installed only seabed without requiring any connection with the surface means.

The method for connecting underwater pipelines, object of the present invention, using a crane equipped support ship and remotely operated vehicles for seabed works and assistance, is characterised by including the following steps:
 a) preliminary installation of a pipeline, called inboard, on a seabed fixed frame;
 b) laying of a pipeline called outboard, provided with buoyancy tanks, drag chains and an installation skid, by a lay barge, and abandonment of the said outboard pipeline in a defined lay down area;
 c) lifting of the said outboard pipeline;
 d) installation of a subsea winch in the foreseen location, provided with guide pins, within the said seabed fixed frame, by the said onboard crane, followed by the locking of the said subsea winch on the said guide pins through hydraulic latches;
 e) connection of a remotely operated vehicle to the said subsea winch and actuation of the said winch by the said vehicle to unwind the cable of the said subsea winch, aided by a second remotely operated vehicle bringing and connecting the end of the said cable to the outboard pipeline, winding of the said cable and following deflection of the said outboard pipeline up to a connection area provided within the said seabed fixed frame, lowering of the said outboard pipeline through the recovery of the said drag chains and their replacement on the said buoyancy tanks, release of each buoyancy tank and drag chains assembly from the said outboard pipeline and recovery on board of the said assemblies;
 f) installation of a metrology system to define the distance and angular misalignment between the two said pipelines ends to be connected;
 g) assembly of a connection system with telescopic capabilities using the measurements of the said metrology system and using a dedicated frame installed on board the said support ship; and
 h) installation of the said connection system on the said seabed fixed frame and connection of the said connection system with the said pipelines ends.

At the end of the tasks above mentioned, sealing tests are performed on all the gaskets of the connection system with known procedures in the field.

Below the various steps of the invention are summarized.

The laying of the installation skid can be performed with the following procedure, known in the state of the art: laying of an outboard pipeline, recovery of the end of the said pipeline onboard the lay barge by a dedicated winch, installation of the said installation skid, laying of the said outboard pipeline, with the said skid installed, in the foreseen lay down area, using the said dedicated winch.

Besides, the laying of the installation skid can be performed with the following procedure, further object of the present invention:
 stop of the laying procedure of the outboard pipeline when the last bar of the said outboard pipeline approaches the first lay barge tensioner, welding of the lower section of the said installation skid on the said last bar of the said outboard pipeline and attachment of a dedicated laying cable, connected to a laying winch, to the other end of the said lower section while the tensioners of the said lay barge are maintained in tension;

release and open to the maximum allowable width of the said lay barge tensioners to let the said lower section pass through them and following start of the laying procedure until the said lower section is passed through the last tensioner of the said lay barge;

stop of the laying procedure to allow the installation of the upper section of the said installation skid, which is brought in position by the cable of the onboard crane and it is welded to the said lower section, and following installation on the said installation skid of the necessary buoyancy tanks, drag chains and acoustic transponder, depending on its weight, and next start of the laying procedure until the said installation skid exits the stinger of the said lay barge;

stop of the laying procedure and installation of the base plate of the said installation skid that is brought in position by the said on board crane wire while divers are required to position and install the said base plate by bolts on the dedicated location on the said installation skid; and laying continues up to installation of the said installation skid on the foreseen lay down area.

The lifting of the outboard pipeline can be performed by bringing the drag chains from the buoyancy tanks to the sea bottom, the said drag chains always being connected to the said buoyancy tanks by steel wires.

The installation of the subsea winch is performed with the following procedure, a further object of the present invention:

docking and installation of two guide posts, one short and the other long, using the onboard crane wire and aided by a remotely operated vehicle that brings them into dedicated guide post receptacles on the base plate located on the seabed fixed frame;

installation of a small subsea winch by a second remotely operated vehicle, used also as hydraulic power supplier, on the foreseen location on the said seabed fixed frame;

deploying of the said subsea winch, provided with sliding centering rings for the guidelineless installation, and stop of the deployment operation at least 5 m above the said seabed fixed frame;

connection of the cable of the said small subsea winch to one of the said centering rings of the said subsea winch by the first said remotely operated vehicle;

actuation of the said small subsea winch while the said subsea winch is gently lowered by the said on board winch crane until the said centering rings engage both the said guide posts; and release of the said cable of the said small subsea winch by the said first remotely operated vehicle and installation of the said subsea winch in the final position.

Said installation of the subsea winch can be also performed using guide lines, i.e. with known procedures in the field.

The recovery on board of the buoyancy tank and drag chains assemblies can be performed with the following known procedure: deployment of a clump weight and connection of the said clump weight to a said single assembly, release of the said assembly by opening of the straps, locking it to the pipeline, through remotely operated vehicle, floating up to the surface of the said assembly with attached the said clump weight, repetition of the previous steps for all the said buoyancy tank and drag chains assemblies installed on the outboard pipeline.

The metrology system can be a mechanical and an acoustic one.

A further object of the present invention is the mechanical metrology system that is composed preferentially by two arms, connected through an hinge, each one provided on its extremity of a ball joint, in turn connected through a releasable hydraulic latch to an installation plate provided with a centering funnel to aid and ease the installation phase using the guide posts, being the said hinge and the said ball joints provided with an hydraulic system to lock/unlock them by a remotely operated vehicle.

In the case where the mechanical metrology system is used, the definition of the distance and angular misalignment between the pipelines ends to be connected can be performed with the following procedure, a still further object of the present invention:

deployment and installation of the mechanical metrology system, being all the moveable sections, i.e. the two ball joints and the central hinge, in unlocked positions during the deployment and installation phase;

actuation, by a remotely operated vehicle, of the hydraulic circuit that freeze the configuration of the said mechanical metrology system in the measured position by locking of both said ball joints and of the said central hinge; and opening, by the said remotely operated vehicle, of the hydraulic latches locking the extremities of the arms to the installation plates in order to recover the said mechanical metrology system without the said installation plates, and limit then at maximum the force acting on the said ball joints and on the said central hinge, and following recovery on board, separately, of the said mechanical metrology system and of the said installation plates.

The installation of the mechanical metrology system can be performed with the following procedure, another object of the present invention:

connection, by a remotely operated vehicle, of both the wires of the small subsea winches, previously installed on defined positions within the seabed fixed frame, to the installation plates of the said mechanical metrology system and actuation, at the same time, of the said small subsea winches through a second remotely operated vehicle while the said mechanical metrology system is gently lowered by the on board crane wire; and stop of the procedure when the guide funnels of the said mechanical metrology system engage both the guide posts installed on the said seabed fixed frame and following release of the said wires of the said small subsea winches and installation of the said mechanical metrology system in the final position.

Said installation of the mechanical metrology system can be also performed using guide lines, i.e. with known procedures in the field.

Yet a further object of the present invention is the acoustic metrology system. The acoustic metrology system is composed preferentially by a transponder unit used as acoustic signal source and processing unit and installed on a reference plate provided by two docking cones, measuring the distance from the said docking cones with respect to a reference target unit installed on a known position on the subsea fixed frame or on the end of the inboard pipeline.

In the case the acoustic metrology system above described is used, the definition of the distance and angular misalignment between the pipelines ends to be connected can be performed with the following procedure, another further object of the present invention:

deployment of the reference plate of the said acoustic metrology system by the on board crane wire and installation on the installation skid aided by a remotely operated vehicle carrying also the transponder unit;

installation of the said transponder unit on the outer docking cone while on the inner docking cone is installed a target unit for the measurement of the vertical misalignment of the said installation skid, following levelling of the said transponder unit with respect to the horizontal plane and pointing to the said target unit to measure the said misalignment with respect to the vertical plane of the said installation skid;

removal of the said target unit for the misalignment by a second remotely operated vehicle and pointing of the said transponder unit to each one of the three screens mounted on the target unit installed on the seabed fixed frame and acquiring of the distance of each said screen with respect to the said transponder unit; and moving of the said transponder unit from the said outer docking cone to the said inner docking cone and pointing of the said transponder unit to each one of the three screens mounted on the target unit installed on the seabed fixed frame and acquiring of the distance of each said screen with respect to the said transponder unit.

The assembly on board the support ship of the connection system can be performed with the following procedure, a further object of the present invention:

installation of the mechanical metrology system on a assembly frame, installed on board the said ship, composed by a support structure carrying two moveable sections, each one including two sliding reference plates, similar to the ones located subsea, i.e. the installation skid base plate and the inboard pipeline base plate, supported by two ball joints, on each said reference plates is in turn installed a mock up of the original hubs installed on the pipeline ends to be connected;

adjustment of the two said reference plates of the said assembly frame to fit with the position of the installation plate of the said mechanical metrology system;

locking of the configuration of the said reference plates through welding of all the moveable sections of the said plates and following removal of the said mechanical metrology system;

installation of the installation plates of the said connection system, which are installed on the said reference plates of the said assembly frame, being composed such a connection system, besides the said installation plates, mainly by two sections, one including a mechanical connector welded to a pipeline section with the same characteristics of the subsea pipeline and carrying two support/centering collars to allow system extension, the other section including a mechanical connector welded to a pipeline section with the same characteristics of the subsea pipeline and carrying two support/centering collars to allow system extension and including also a telescopic joint, in turn including its related locking system;

installation of the two said sections of the said connection system on the said assembly frame in such a way to have between the said mechanical connectors and the said hubs mock up the design clearance; and preparation and installation of a pipe piece between the two said sections and connection of the said pipe piece to the said sections to obtain then the connection system assembled, completed by the installation of dedicated support cradles, shock absorbers and centering rings.

The adjustment of the assembly frame is preferentially based on the measurements acquired by the acoustic measurement system above described and in accordance with the definition of the distance and angular misalignment performed with the procedure above described.

The installation of the connection system can be performed with the following procedure, yet a further object of the present invention:

connection, by a remotely operated vehicle, of both the wires of the small subsea winches, previously installed on defined positions within the seabed fixed frame, to the centering rings mounted on the installation plates of the said connection system and actuation, at the same time, of the said small subsea winches through a second remotely operated vehicle while the said connection system is gently lowered by the on board crane wire; and stop of the procedure when the said centering rings engage both the guide posts installed on the said seabed fixed frame and following release of the said wires of the said small subsea winches and installation of the said connection system in the final position.

Said installation of the connection system can be also performed using guide lines, i.e. with known procedures in the field.

The connection of the connection system with the pipelines ends is performed with the following known procedure:

extension, by a remotely operated vehicle providing hydraulic power, of the telescopic joint and, maintaining pressure inside the said joint, closing of the mechanical connectors;

performing of sealing tests on both the said connectors; and actuation, by the said remotely operated vehicle, of the locking system of the said telescopic joint and energising of an internal gasket to seal the whole system, with following sealing test of the said gasket.

Each step of the method, another object of the present invention, can be controlled by visual indicators mounted on each component of the system, in turn monitored by underwater TV cameras installed on the remotely operated vehicles, which are:

indicators of contact between surfaces to monitor the installation of all the components on the seabed fixed frame, each of the said indicator is formed by a painted pin kept in position by a return spring, once the surfaces are in contact, the said pin is pushed outside making visible the said painted section of the said pin itself;

indicators of hydraulic cylinders status to monitor the function being actuated, consisting in making each said cylinder with double rod and painting the external section, seeing or not the said painted rod will give the said cylinder status;

pressure indicators, to monitor hydraulic components status, represented by pressure gauges installed on each module;

mechanical revolution counter to monitor the length of the subsea winch cable wind/unwind; and bar indicators to monitor the status of the mechanical connectors and of the telescopic joint.

Each step of the method, a further object of the present invention, can be alternately monitored through electronic sensors mounted on each component of the system and directly linked to a control unit located on the support ship through a dedicated cable of the remotely operated vehicles.

The connection system can be of any type and composed by two connectors of any type and by a telescopic section, or a connection system including the telescopic capability in the said connectors.

The actuation of the moveable components of the connection system, i.e. the mechanical connectors and the telescopic joint, can be performed by mechanical and/or hydraulic tools both internal and external to the said connection system.

The deflection operation of the outboard pipeline can be performed by a subsea winch directly installed on the seabed or in other position different from the one provided on the seabed fixed frame.

The connection system can be installed with the seabed fixed frame and the intervention procedures require only the installation of the outboard pipeline.

The support frames, both for the inboard and the outboard pipelines, installed on the said seabed fixed frame, can be positioned in front, or inside, or in any other location with respect to the said seabed fixed frame, and can be connected to the said seabed fixed frame through whatever system during, or after, the installation of the said seabed fixed frame.

An alternative method consists laying directly the outboard pipeline in the connection area provided on the seabed fixed frame without requiring any deflection operation, including in that all the possible installation methods, i.e.:

direct installation at the end of the laying procedure ("second end");

direct installation at the start of the laying procedure ("first end").

Each step of the invention, including the alternative above described, can be performed, in the preferred embodiment, without any need of immersed personnel; however it can be also performed by immersed personnel carrying out some, or all, the foreseen operations, being maintained the spirit of the present invention.

BRIEF DESCRIPTION OF THE DRAWINGS

The actual operation and advantages of the present invention will be better understood by referring to the following detailed description and the attached figures in which:

FIGS. 1 and 2 are plan and side views of the seabed fixed frame where, in accordance to the method of the present invention, the connection between the two pipeline sections is performed.

FIG. 3 is a plan view of a possible lay barge layout during laying, showing the main interesting items; FIG. 4 is a side view of the buoyancy tanks and drag chains installation; FIGS. 5, 6, and 7 are side views of the three main steps related to the mounting of the installation skid.

FIG. 8 shows the subsea winch docking phase using the small subsea winch; FIG. 9 shows the subsea winch installed.

FIGS. 12 to 14 are plan views of the pipeline deflection operation, in accordance to the preferred embodiment of the present invention. In particular: FIG. 12 shows the unwinding and installation of the deflection cable by remotely operated vehicle; FIG. 13 shows the pipeline during the deflection; FIG. 14 shows the pipeline at the end of the deflection ready for the lowering operation.

FIG. 15 shows the pipeline configuration at the end of the deflection procedure, FIG. 16 shows the lowered pipeline configuration after recovery of the drag chains.

FIG. 17 shows the remotely operated vehicle going to release the buoyancy tanks/drag chains assembly; FIG. 18 shows the said buoyancy tanks/drag chains assembly floating up to the surface.

FIG. 21 shows the mechanical metrology module docking phase using the small subsea winches; FIG. 22 shows the said mechanical metrology module installed and operated by a remotely operated vehicle.

FIG. 26 shows the installation of the two sections in which the connection system is split before assembly; FIG. 27 shows the installation of the piece of pipe, connecting the two sections, shaped in such a way to adjust the connection system on the right configuration given by the mock up structure; FIG. 28 shows the assembled connection system configuration before removal from the mock up structure.

FIG. 31 shows the connection system docking phase using the small subsea winches; FIG. 32 shows the connection system installed and the recovery by remotely operated vehicles of the small subsea winches; FIG. 33 shows the connection system after completion of the connection procedure by remotely operated vehicle.

FIGS. 35 and 36 are plan and side views of the installation of the acoustic metrology system, in accordance to an alternative measurement system for the present invention.

DESCRIPTION OF THE PREFERRED EMBODIMENTS

Figure 3:
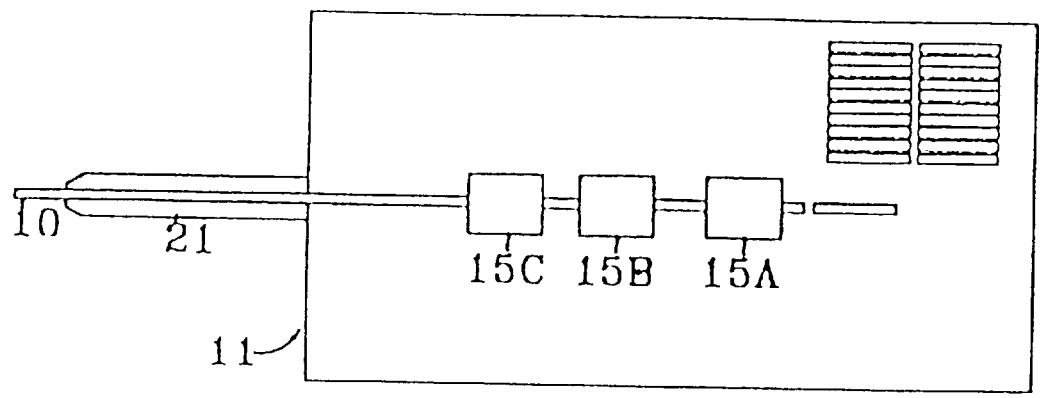
FIGS. 3 to 7 show different steps relevant to the installation of the foreseen pipeline fittings, i.e. buoyancy tanks, drag chains and installation skid, in accordance to the preferred embodiment of the present invention. In particular.
Figure 4:
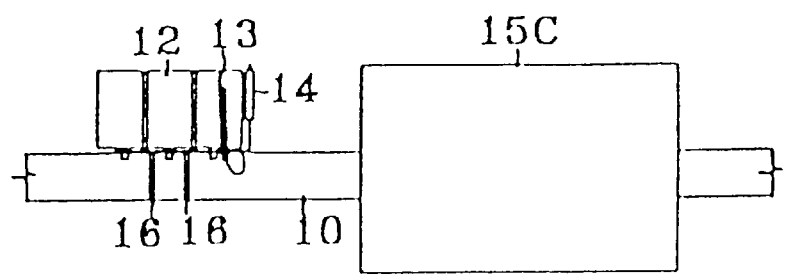
Figure 5:
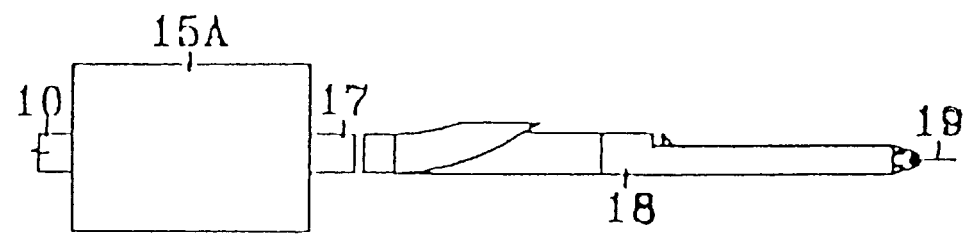
Figure 6:
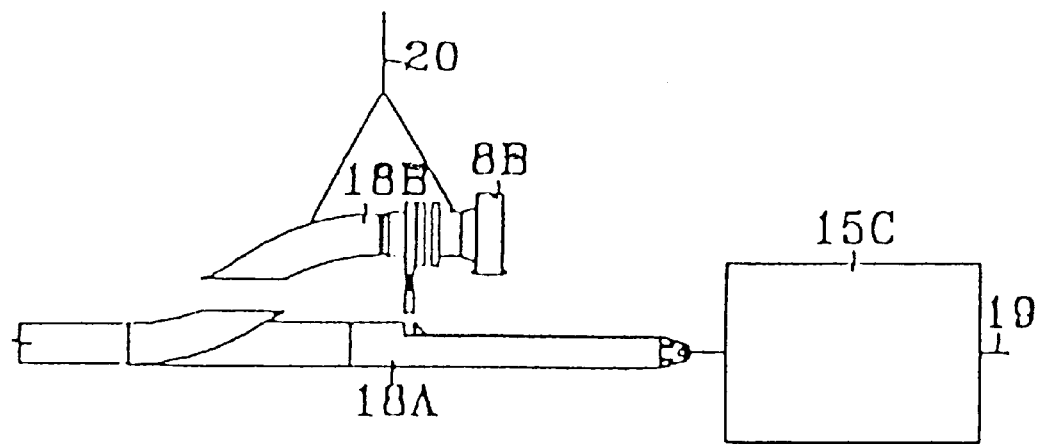

Referring now to FIGS. 1 and 2, a subsea structure 1, representing alternately an Export Riser Base, a Template or a generic structure requiring an operation object of the present invention, is disposed on marine bottom 9. Other frames, part of the present invention, are attached to the said subsea structure 1 by welding or by other known means (not shown): the inboard hub support frame 2, supporting both the pre-installed pipeline section 7, whose end is protected by a cap 8A to avoid water intrusion, and the base plate 3, aimed to serve as reference for the installation of the various modules considered in the present invention; the installation skid support frame 4 representing the reference area for the installation of the laid section of the pipeline 10 (see FIG. 3) to be connected; the base plate 5 representing the reference area for the installation of the first subsea winch 28 (see FIG. 8) aimed to deflect the said laid section of the pipeline 10 (see FIG. 3); the base plate 6 representing the reference area for the installation of a second subsea winch, similar to the said one 28 (see FIG. 8), aimed to pull, in case of emergency, the said laid section of the pipeline 10 (see FIG. 3).

Referring to FIGS. from 4 to 7, the second pipeline section 10 to be connected is laid by a suitable lay barge 11 with standard laying procedures (known), hereinafter, instead, are given the special procedures for the laying of the last part of the said second pipeline section 10 including equipments of the present invention. The pipeline section 10 is laid with installed the buoyancy tanks 12, drag chains 13, and acoustic transponder 14. The assembly (12+13+14) is installed on the pipeline section 10 at given spacing, after the last lay barge tensioner 15C, through dedicated releasable straps 16. The laying procedure is stopped when the last bar 17 of the pipeline section 10 approaches the first lay barge tensioner 15A. The lower section 18A of the installation skid 18 is then welded to the last bar 17 of the pipeline section 10 and a laying cable 19 is attached to the said lower section 18A. The cable 19 is connected to a dedicated laying winch (not shown) able to guarantee the required laying pull force. During all the operation, the lay barge tensioners (15A+15B+15C) force is maintained. The laying cable 19 is tensioned and the lay barge tensioners (15A+15B+15C) are released and opened to the maximum allowable width to let the lower section 18A of the installation skid 18 pass through them. The laying procedure is then started until the lower section 18A of the installation skid 18 passes over the last lay barge tensioner 15C. The laying procedure is stopped again to allow the installation of the upper section 18B of the installation skid 18 which shall be welded on the location provided on the lower section 18A. The upper section 18B is moved in the foreseen location by the on board crane wire 20 and welded to the lower section 18A. The installation skid 18 is then provided with the necessary buoyancy tanks 12, drag chains 13 and acoustic transponder 14, depending on its weight. Laying procedure continues until the installation skid 18 exits the lay barge stinger 21. The laying is then stopped and the installation skid base plate 18C is brought in position by the on board crane wire 20. Divers are required to position and install the base plate 18C by bolts on dedicated location (not shown) on the installation skid 18 itself. After this, laying continues with standard procedure, not described, up to the installation of the installation skid 18 on the foreseen lay down target area 34 (see FIG. 12) located at defined position with reference to the subsea structure 1 (see FIG. 1).

Figure 8:
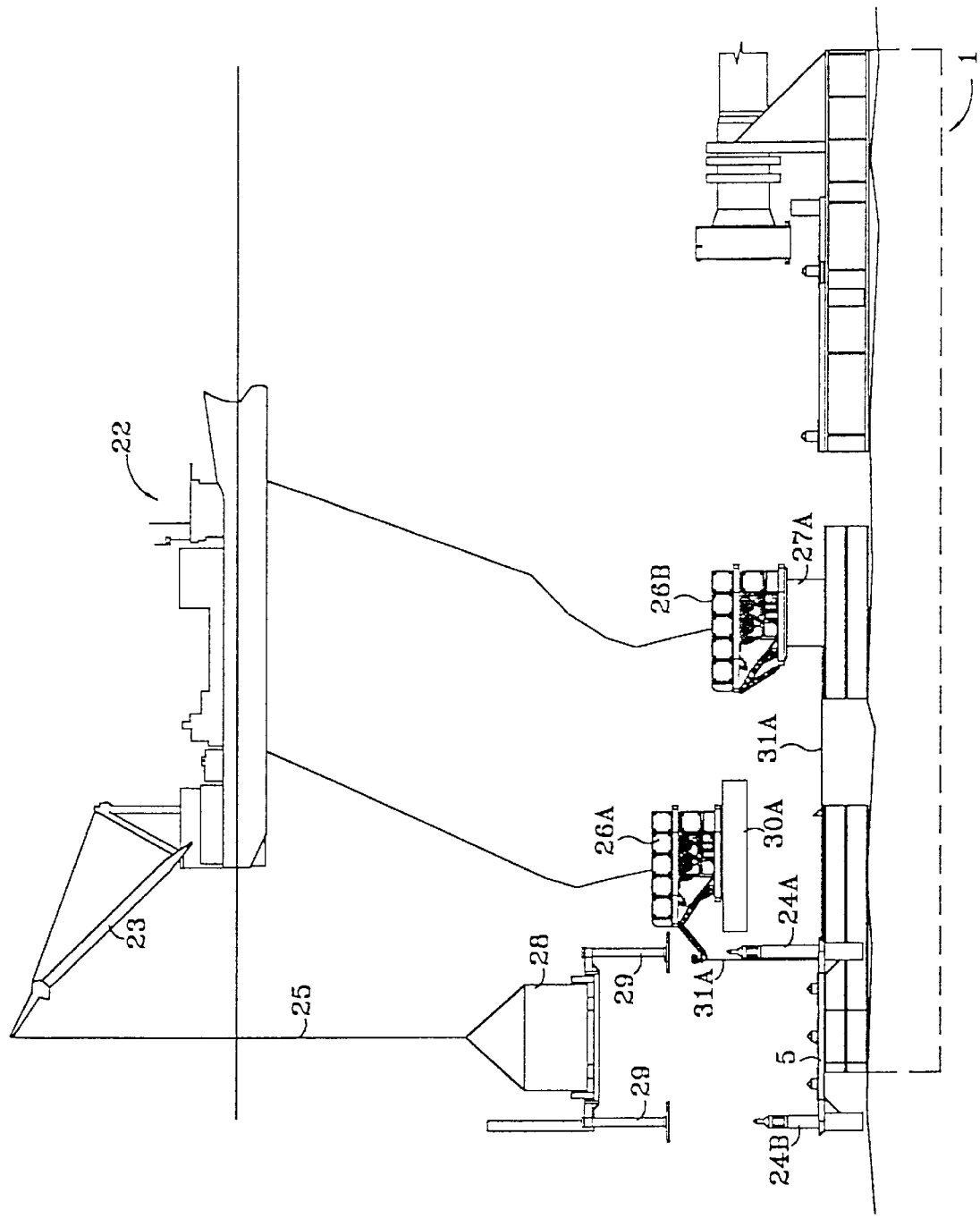
FIGS. 8 and 9 are side views of the installation of the subsea winch, in accordance to the preferred embodiment of the present invention. In particular.
Figure 9:
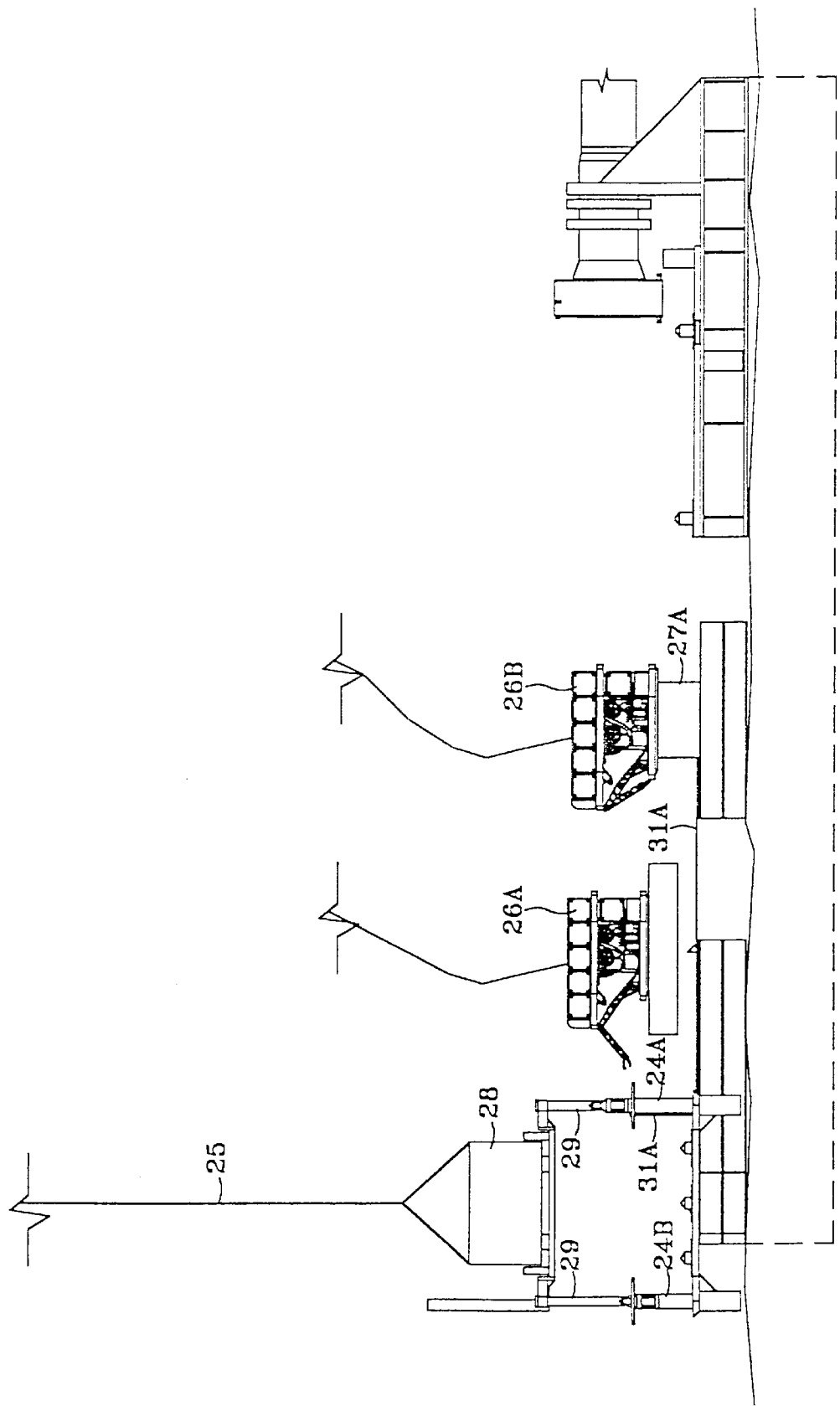
Figure 10:
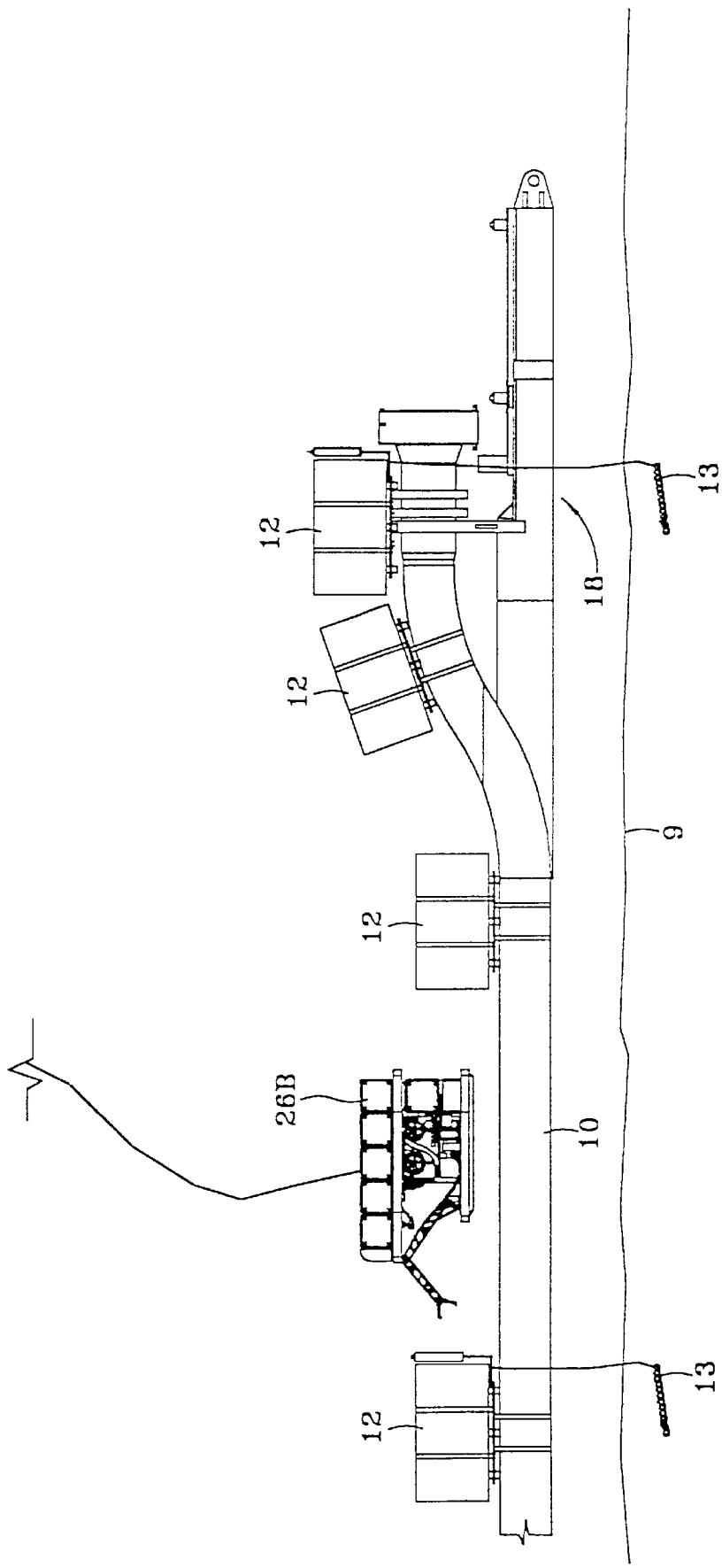
FIG. 10 is a side view of the pipeline lifting operation by remotely operated vehicle, in accordance to the preferred embodiment of the present invention.
Figure 11:
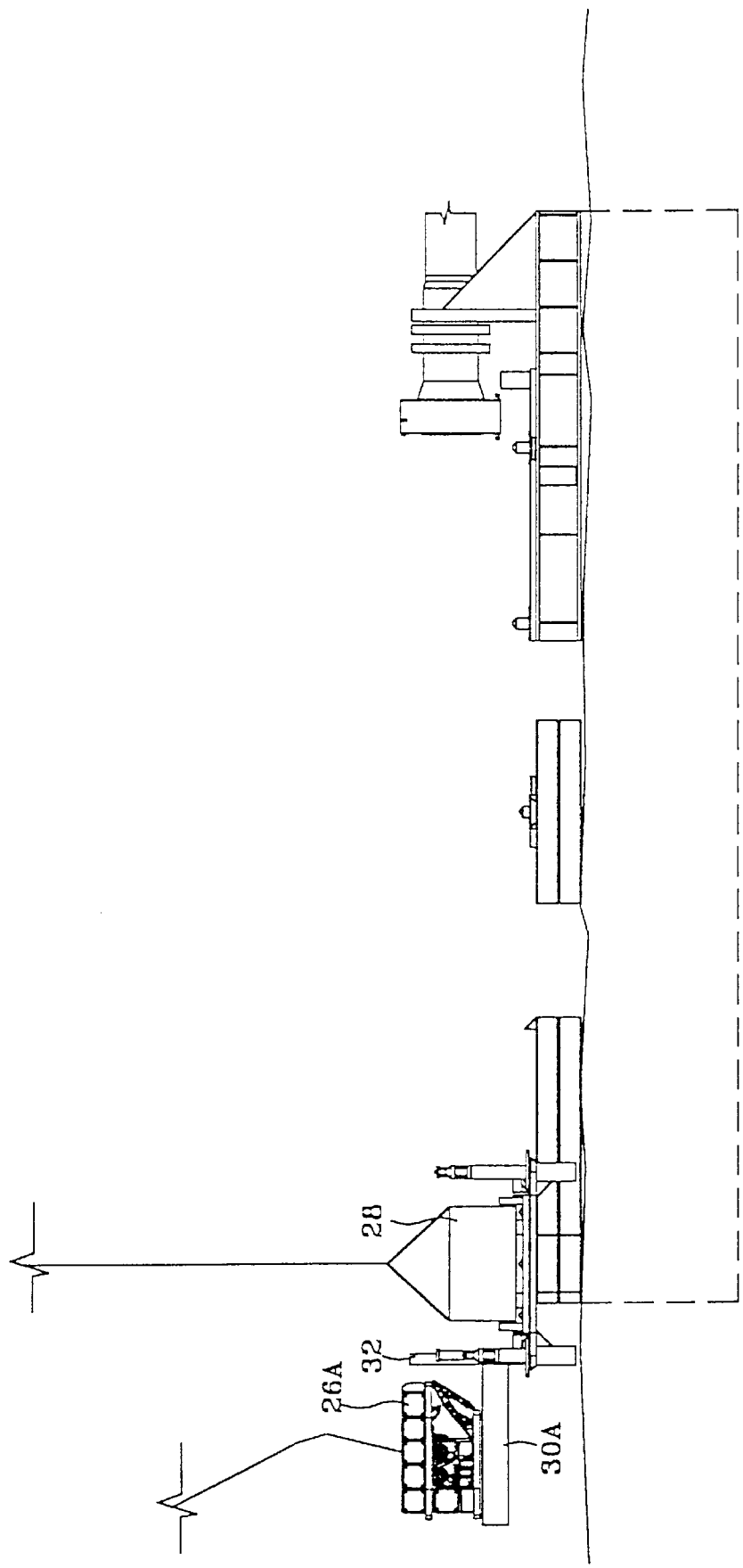
FIG. 11 is a side view of the remotely operated vehicle connection and actuation of the subsea winch, in accordance to the preferred embodiment of the present invention

Referring to FIG. 8, a depot ship 22 with a crane 23 is on site ready to start the intervention. All the system's modules and equipment are located on board. Two guide posts, one long 24A and one short 24B, are deployed using the on board crane wire 25. The docking and installation of the guide posts is aided by a remotely operated vehicle 26A that brings them into the dedicated guide post receptacles on the base plate 5 located on the subsea structure 1. A small subsea winch 27A is installed by the second remotely operated vehicle 26B on the foreseen location (not shown) on the subsea structure 1. The remotely operated vehicle 26B will permanently be connected to the winch 27A in order to provide hydraulic power. The subsea winch 28 is deployed provided with the sliding centering rings 29 for the guideslineless installation. Deployment operation shall stop at least 5 m above the subsea structure 1. The first remotely operated vehicle 26A, provided with a dedicated interface skid 30A, connects the small winch cable 31A to the centering ring 29. Referring to FIG. 9, the small subsea winch 27A is actuated while the subsea winch 28 is gently lowered by the on board crane wire 25. This operation is performed until the centering rings 29 engage both the guide posts 24A 24B. Then the small winch cable 31A is released by the remotely operated vehicle 26A and the subsea winch 28 is lowered in the final position. The small winch 27A is recovered on board and disconnected from the remotely operated vehicle 26B, which is then launched again to perform laid pipeline section 10 lifting operation. This is done (see FIG. 10) by releasing of the drag chains 13 located on each buoyancy tank 12, starting from the first buoy located on the installation skid 18, and their positioning on the sea bottom 9. Referring to FIG. 11, the first remotely operated vehicle 26A, through the provided interface skid 30A, stabs in the dedicated panel 32 mounted on the subsea winch 28 and actuates the hydraulic latches (not shown) to lock the subsea winch 28 in position.

Figure 12:
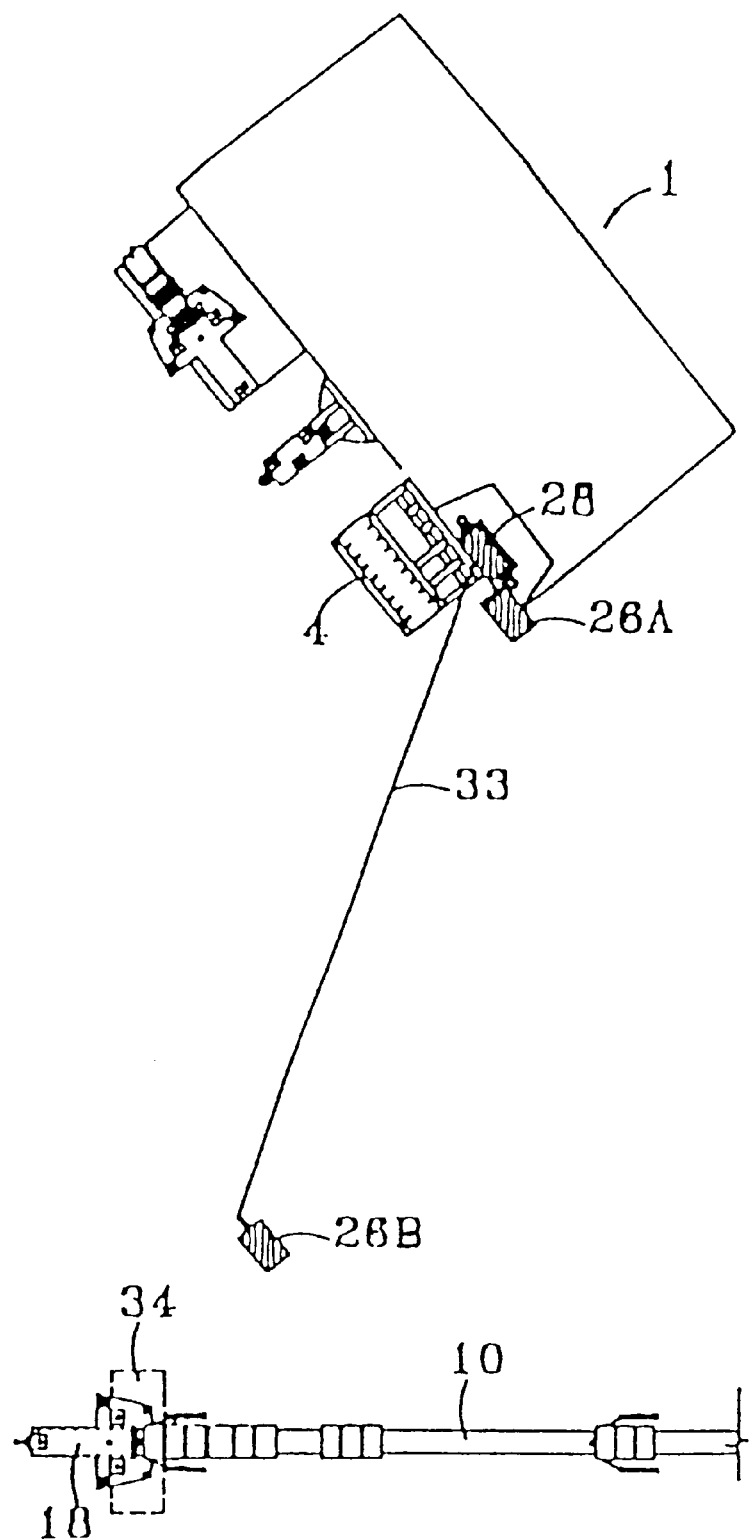
Figure 13:
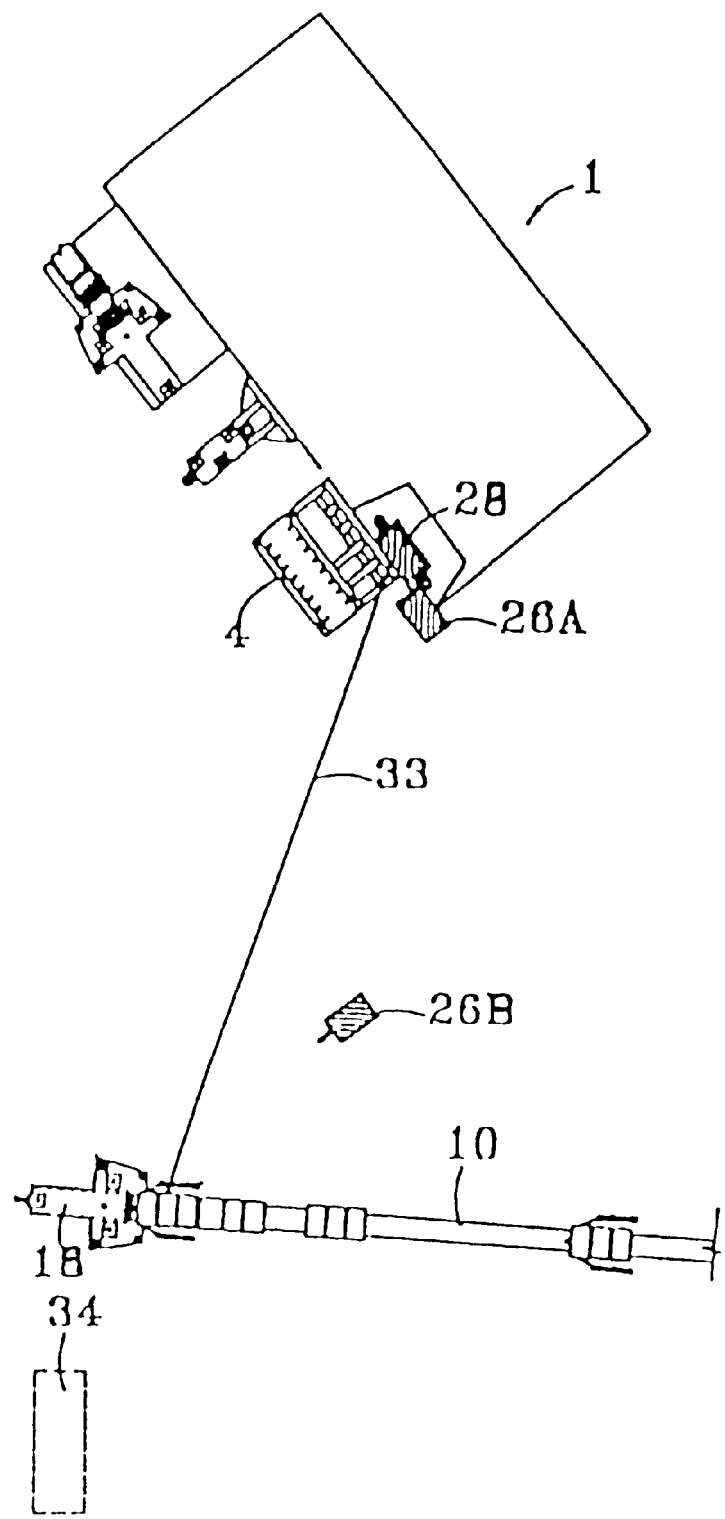
Figure 15:
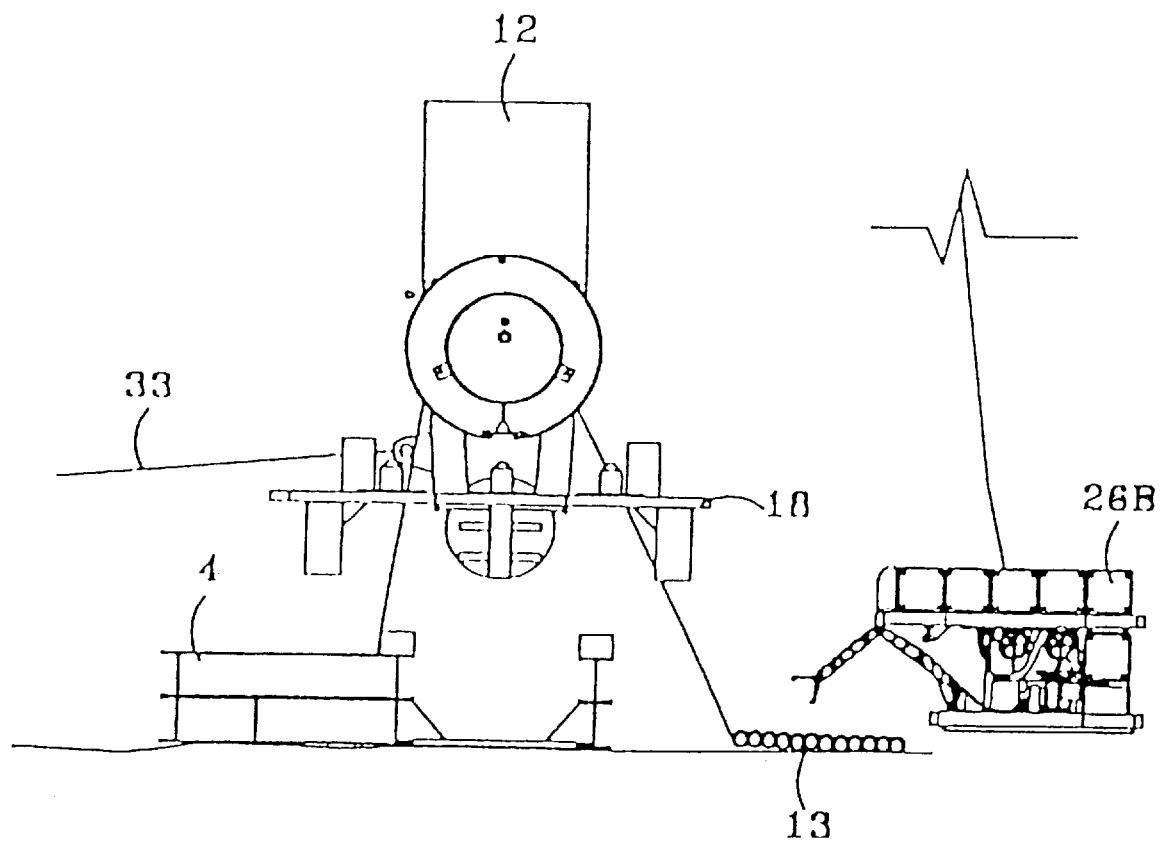
FIGS. 15 and 16 are front views of the pipeline lowering operation performed by remotely operated vehicle, in accordance to the preferred embodiment of the present invention. In particular.
Figure 16:
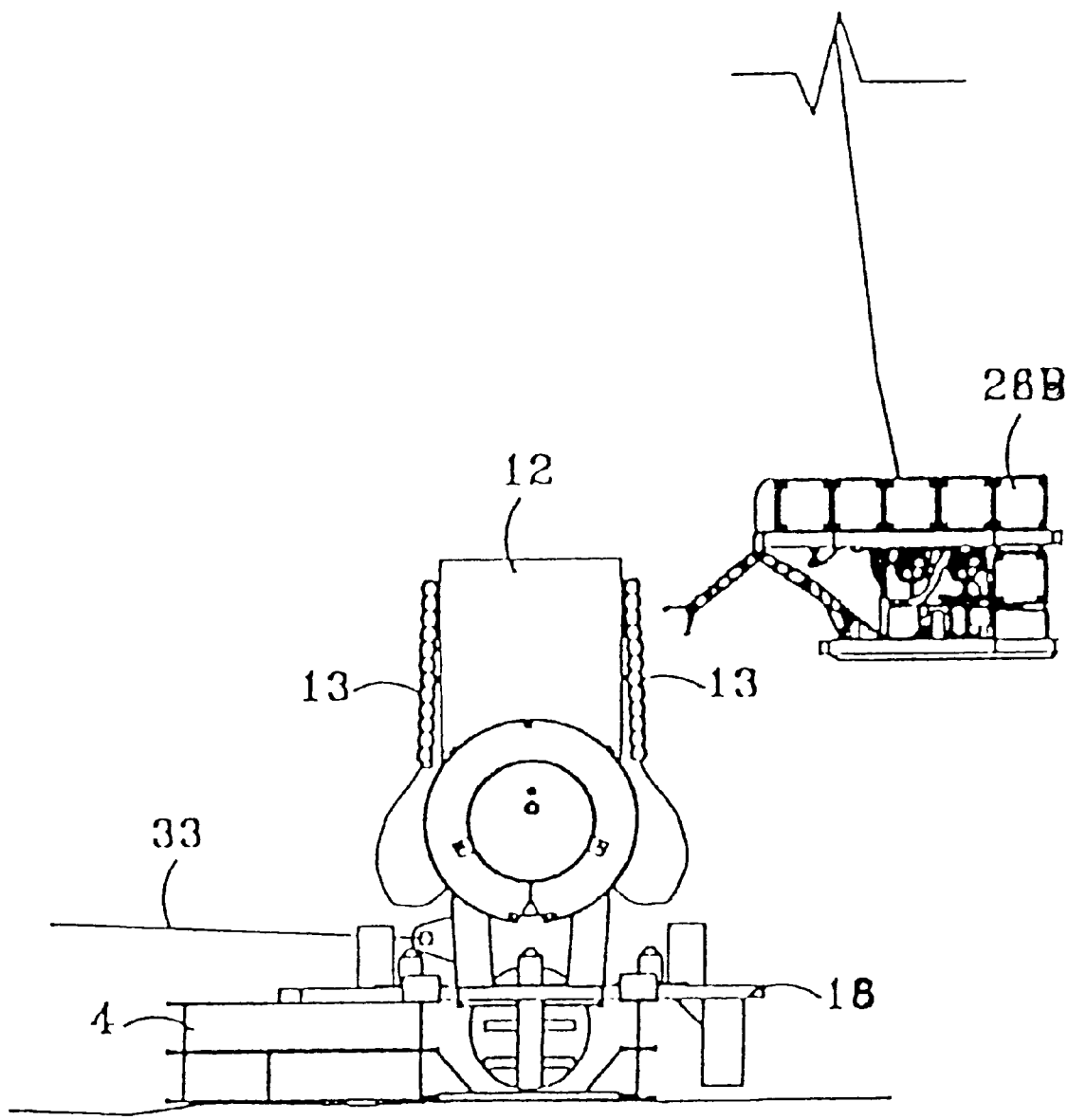
Figure 17:
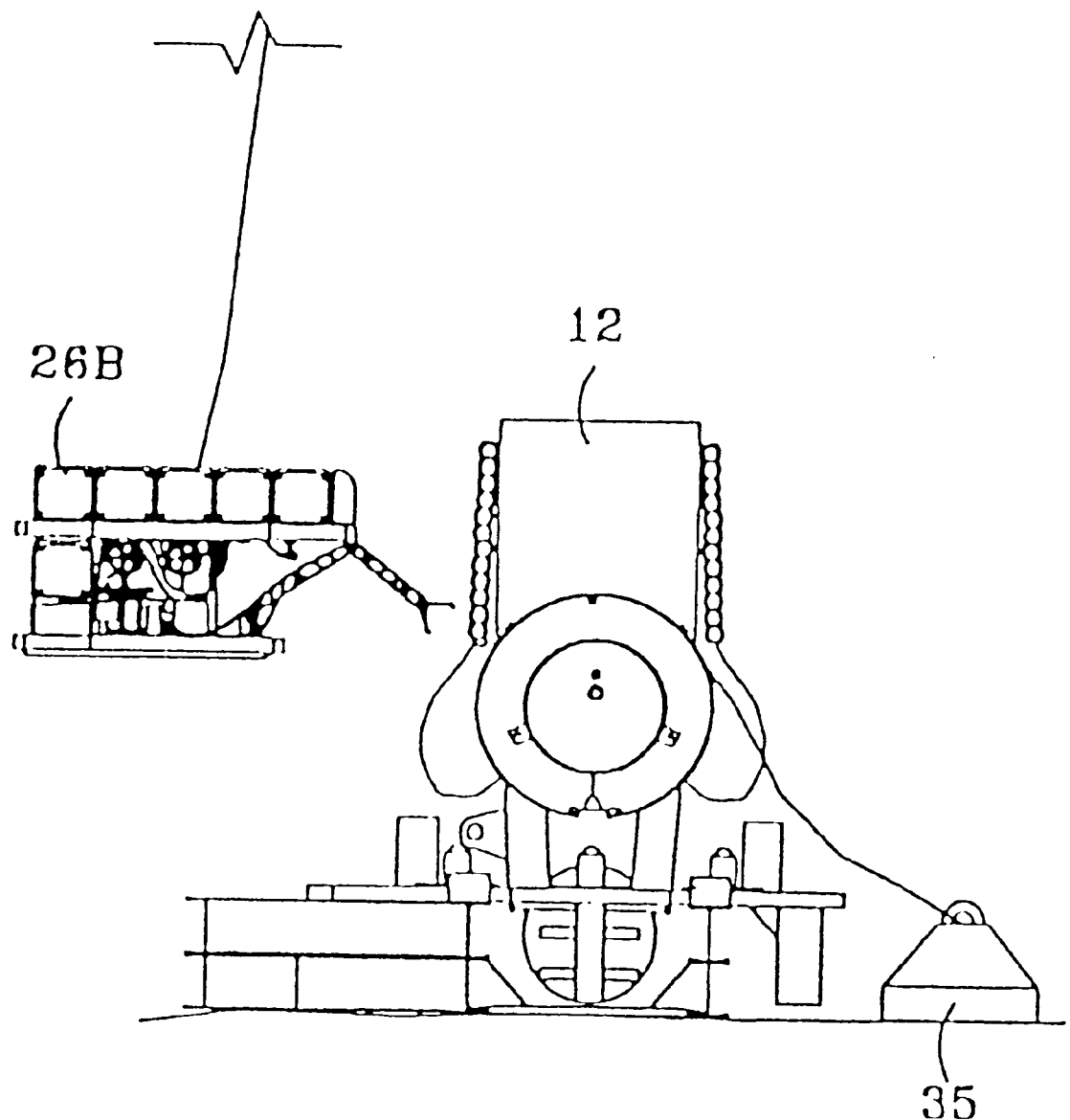
FIGS. 17 and 18 are front views of the buoyancy tanks/drag chains release and recovery on the surface by remotely operated vehicle, in accordance to the preferred embodiment of the present invention. In particular.
Figure 18:
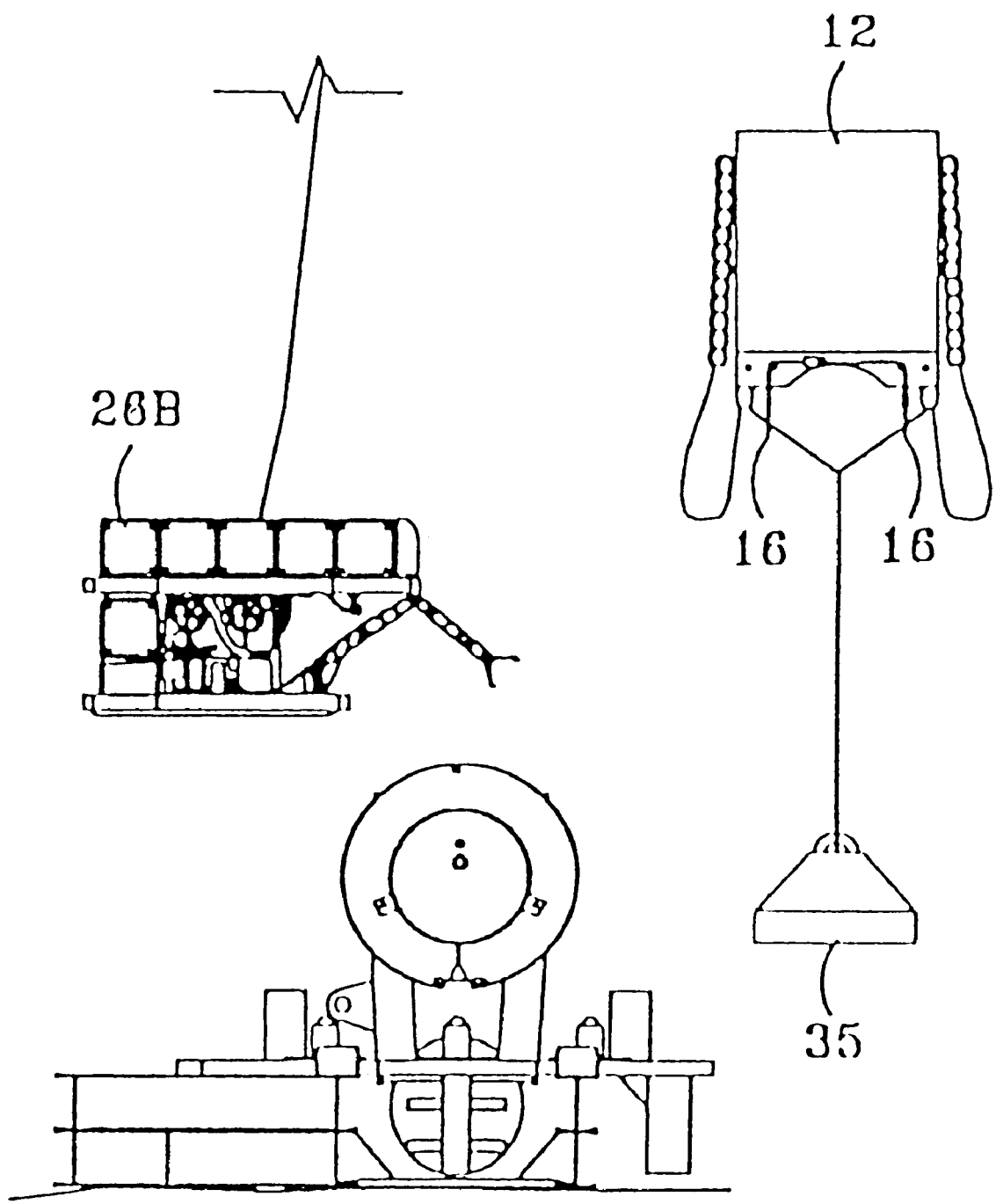
Figure 19:
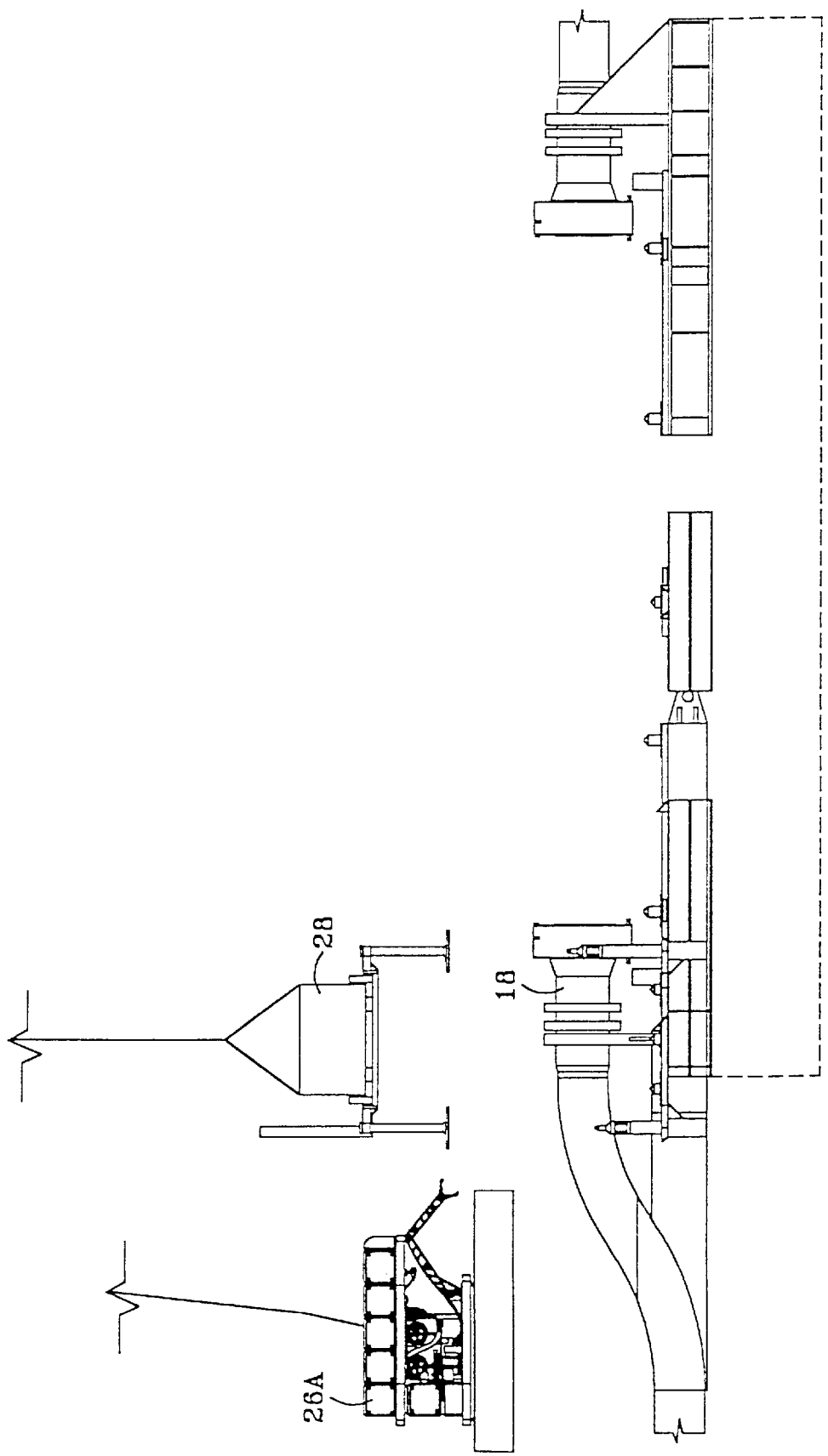
FIG. 19 is a side view of the recovery of the subsea deflection winch, in accordance to the preferred embodiment of the present invention.

Referring to FIGS. 12, 13, and 14, the second remotely operated vehicle 26B, then, brings the deflection cable 33 end towards the installation skid 18. The operation is driven by the first remotely operated vehicle 26A providing hydraulic power to the subsea winch 28 in order to allow deflection cable 33 unwinding. After installation of the deflection cable 33, the first remotely operated vehicle 26A actuates the subsea winch 28 to deflect the pipeline section 10 from the lay down target area 34 until the installation skid 18 reaches the final position over the installation skid support frame 4 on the subsea structure 1. Pipeline lowering operation is then started. This is done (see FIGS. 15 and 16), using the remotely operated vehicle 26B, by recovery of the drag chains 13 and their replacing on the initial positions onto the buoyancy tanks 12. The operation is performed while keeping tensioned the deflection cable 33, in order to maintain the installation skid 18 in position over the installation skid support frame 4. Buoyancy tanks 12 and drag chains 13 assemblies are then recovered on board by a dedicated procedure which consists in (see FIGS. 17 and 18): deployment of a clump weight 35 and connection of the said clump weight 35 to the buoyancy tank 12, release of the said buoyancy tank 12 by opening of the straps 16, floating of the buoyancy tank 12 with the attached clump weight 35 up to surface. The first remotely operated vehicle 26A, after disconnection of the deflection cable 33 (not shown—see FIG. 16) from the installation skid 18, unlocks the hydraulic latches (not shown) to free the subsea winch 28 and allow its recovery (see FIG. 19).

Figure 20:
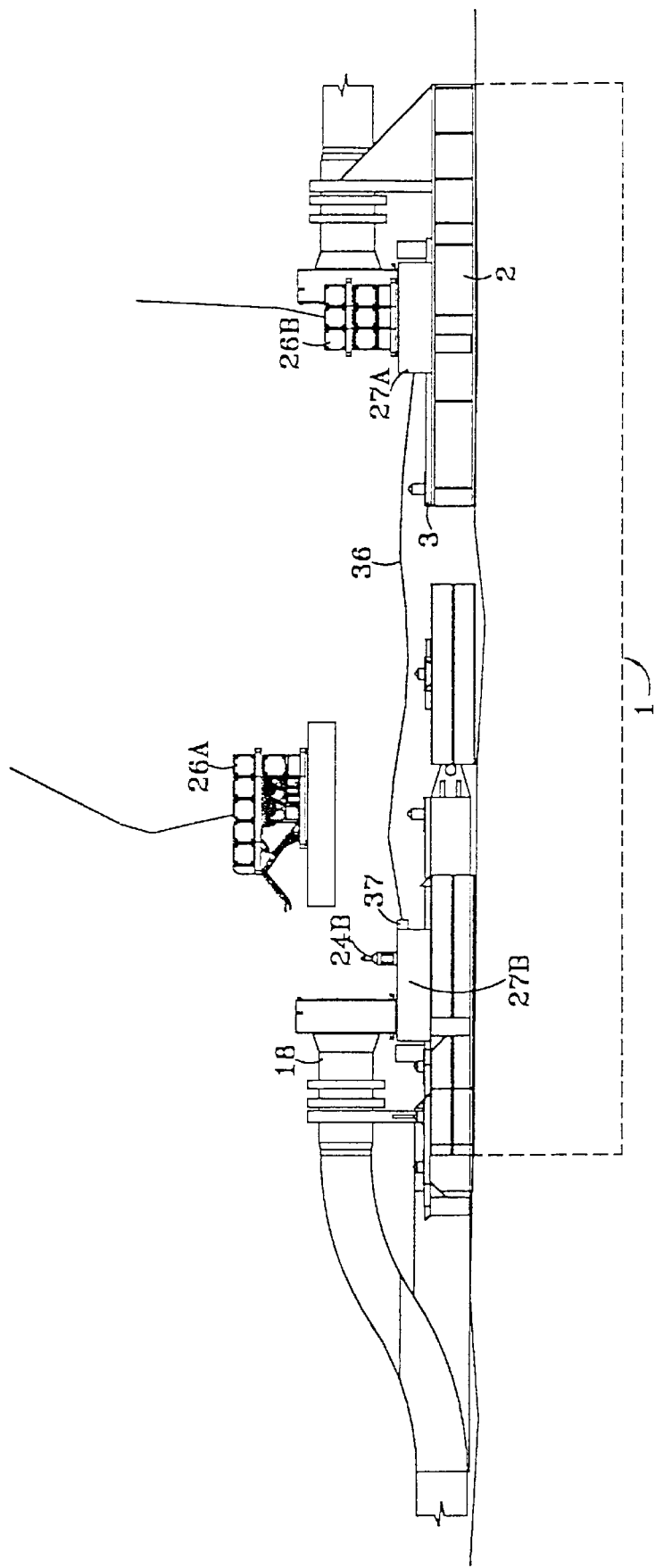
FIG. 20 is a side view of the installation and connection of the small subsea winches used for the guidelineless installation of all the equipments, in accordance to the preferred embodiment of the present invention.
Figure 21:
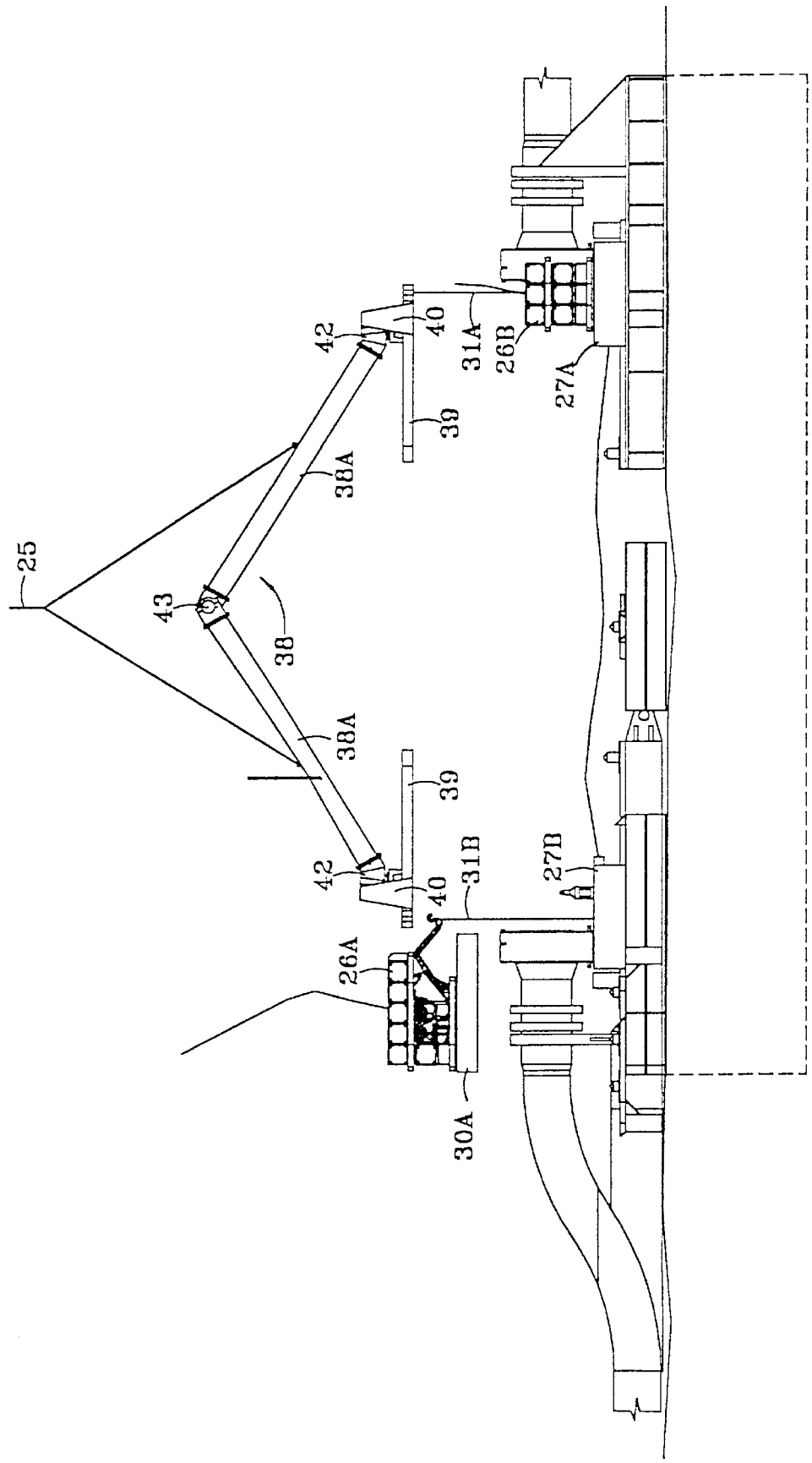
FIGS. 21 and 22 are side views of the installation and operation of the mechanical metrology module, in accordance to the preferred embodiment of the present invention. In particular.
Figure 22:
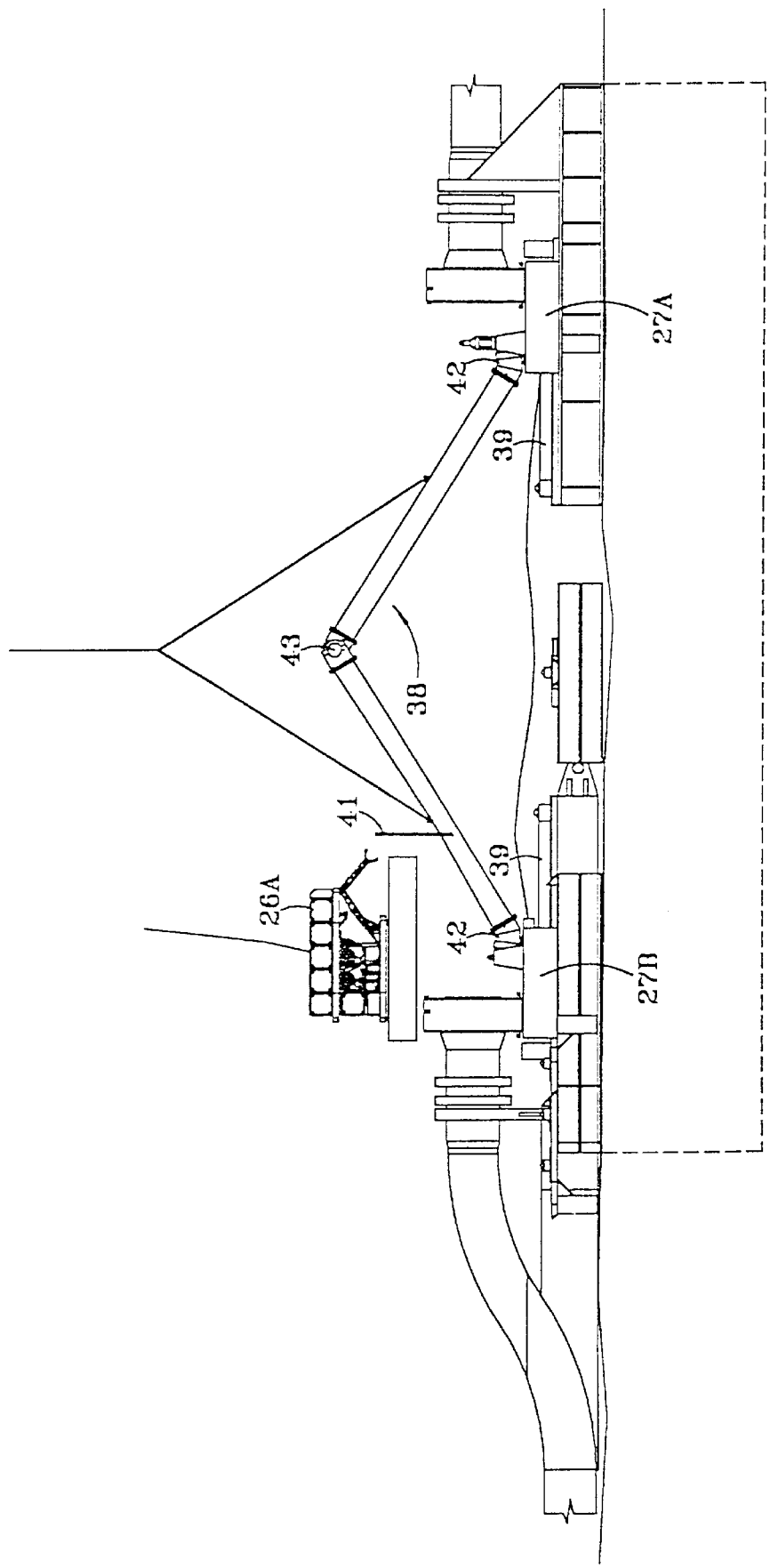
Figure 23:
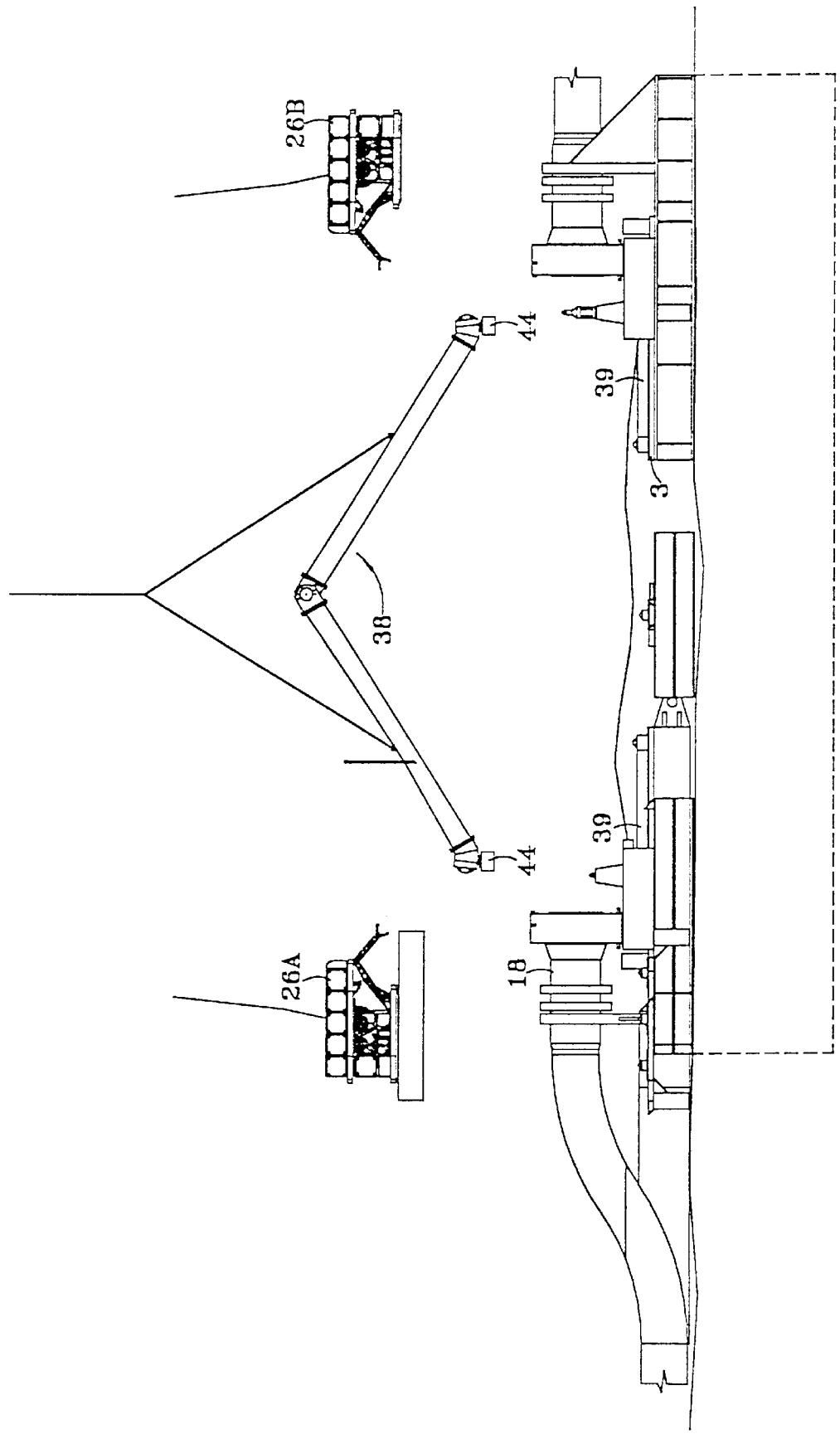
FIG. 23 is a side view of the recovery of the mechanical metrology module, in accordance to the preferred embodiment of the present invention.

Referring to FIG. 20, the guide posts 24A and 24B are moved into the dedicated guide post receptacles (not shown) on the installation skid 18 and on the inboard hub support frame's base plate 3. The shorter guide post 24B is located on the installation skid 18. The longer guide post 24A is not visible. Both the small subsea winches 27A and 27B are installed on the foreseen locations (not shown) on the subsea structure 1. The first remotely operated vehicle 26B will permanently be connected to the second small subsea winch 27A installed on the location closer to the inboard hub support frame 2, in order to provide hydraulic power for both said small subsea winches. The second remotely operated vehicle 26A connects hydraulically the two said small subsea winches 27A and 27B by means of a dedicated flexible hose 36. The said flexible hose 36 is on one side fixed to the second installed small subsea winch 27A, while on the other carries a mateable hydraulic underwater connector 37 to be connected to the first small subsea winch 27B. The mechanical metrology module 38 is deployed (see FIG. 21). The said module 38 consists of two arms 38A connected through a hinge 43, each arm 38A is provided, on its extremity, with a swivel joint 42 in turn connected, through a releasable hydraulic latch (not shown), to the module's installation plates 39. Each installation plate 39 is provided with a centering funnel 40 to aid and ease the installation phase using the guide posts 24A 24B; the said funnel 40 is used instead of the centering rings 29 (see FIG. 9) in order to minimize the installation tolerances of the said module 38. The said hinge 43 and said swivels 42 are provided with an hydraulic system (not shown) to lock/unlock them by a remotely operated vehicle. During deployment and installation, all the moveable sections, i.e. the two swivels 42 and the central hinge 43, are in an unlocked position. Deployment operation shall stop at least 5 m above the subsea structure 1. The second remotely operated vehicle 26A, launched with the interface skid 30A, connects both the small subsea winch cables 31A and 31B to the installation plates 39 of the mechanical metrology module 38. Both the small subsea winches 27A and 27B are then actuated at the same time by the remotely operated vehicle 26B, while the module 38 is gently lowered by the on board crane wire 25. This operation is performed until the guide funnels 40 engage both the guide posts 24A and 24B. Then the small subsea winches' cables 31A and 31B are released and the mechanical metrology module 38 is lowered in the final position (see FIG. 22). The second remotely operated vehicle 26A checks that the mechanic latches (not shown) engage both the installation skid 18 and the inboard hub support frame's base plate 3 to lock the module installation plates 39 in position. No remotely operated vehicle stab into the dedicated panel 41 is requested, expect for emergency purposes, since all the actuations are foreseen to be power supplied by dedicated hydraulic accumulators (not shown) installed on the mechanical metrology module 38 itself. The second remotely operated vehicle 26A actuates then the hydraulic circuit that freeze the mechanical metrology module 38 configuration in the measured position by locking of both the swivels 42 and of the central hinge 43. The first remotely operated vehicle 26B disconnects from the second small subsea winch 27A to assist the recovery operations. Both the small subsea winches 27A and 27B are left subsea for connection system installation. Referring now to FIG. 23, the second remotely operated vehicle 26A opens then the latches (not shown) locking the arms' ends 44 with the installation plates 39 in order to recover the mechanical metrology module 38 without the said installation plates 39 and limit then at maximum the force acting on the swivels 42 and hinge 43 during the said recovery procedure, then increasing the system reliability. The mechanical metrology module 38 is then gently recovered up to an height of 10 m from the seabed under strict control of both remotely operated vehicles 26A and 26B. This to guarantee that no impacts occur, during the lifting, which could cause errors/deformation in the said mechanical metrology module 38 frozen configuration. Then the said module 38 is recovered on board with standard procedure, while the installation plates 39 are recovered separately (not shown). The mechanical latches (not shown), locking the said installation plates 39 to both the installation skid 18 and the inboard hub support frame's base plate 3, disengage automatically when the installation plates 39 are pulled up.

Figure 7:
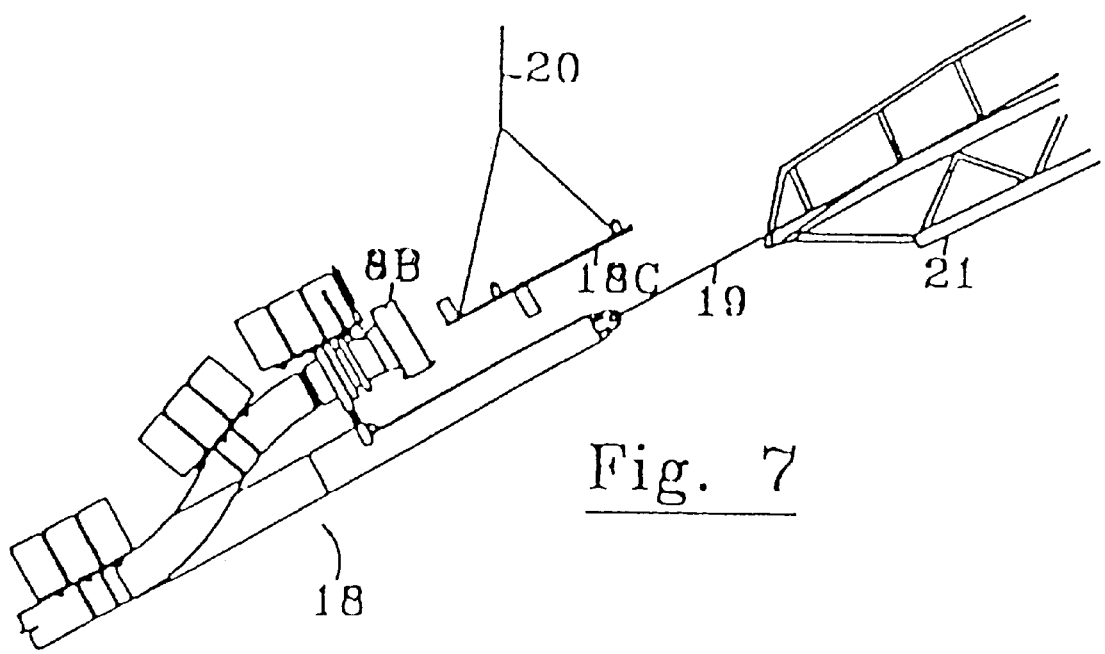
Figure 24:
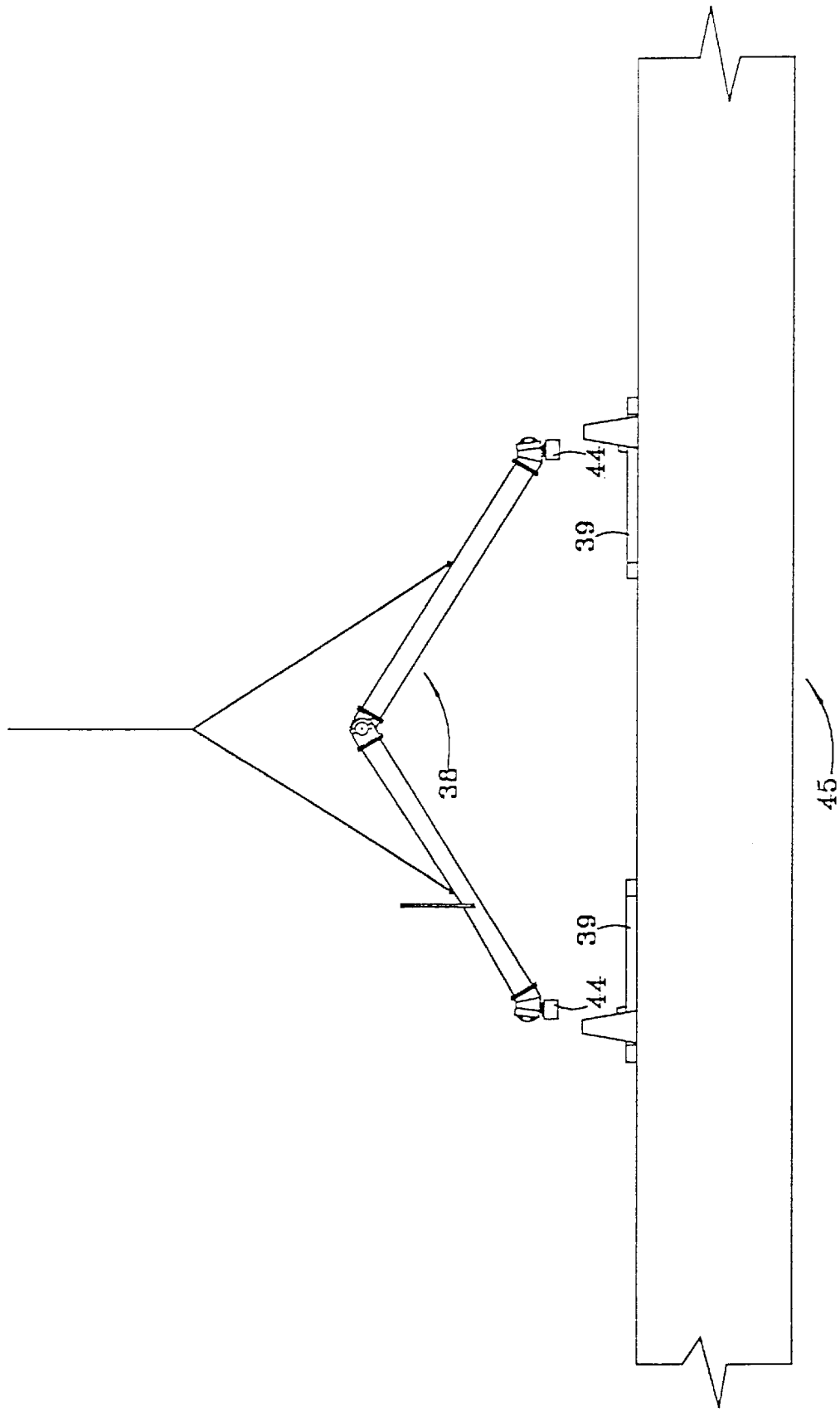
FIG. 24 is a side view of the re-connection, performed on board the provided depot ship, of the mechanical metrology module with its installation plates, in accordance to the preferred embodiment of the present invention.
Figure 25:
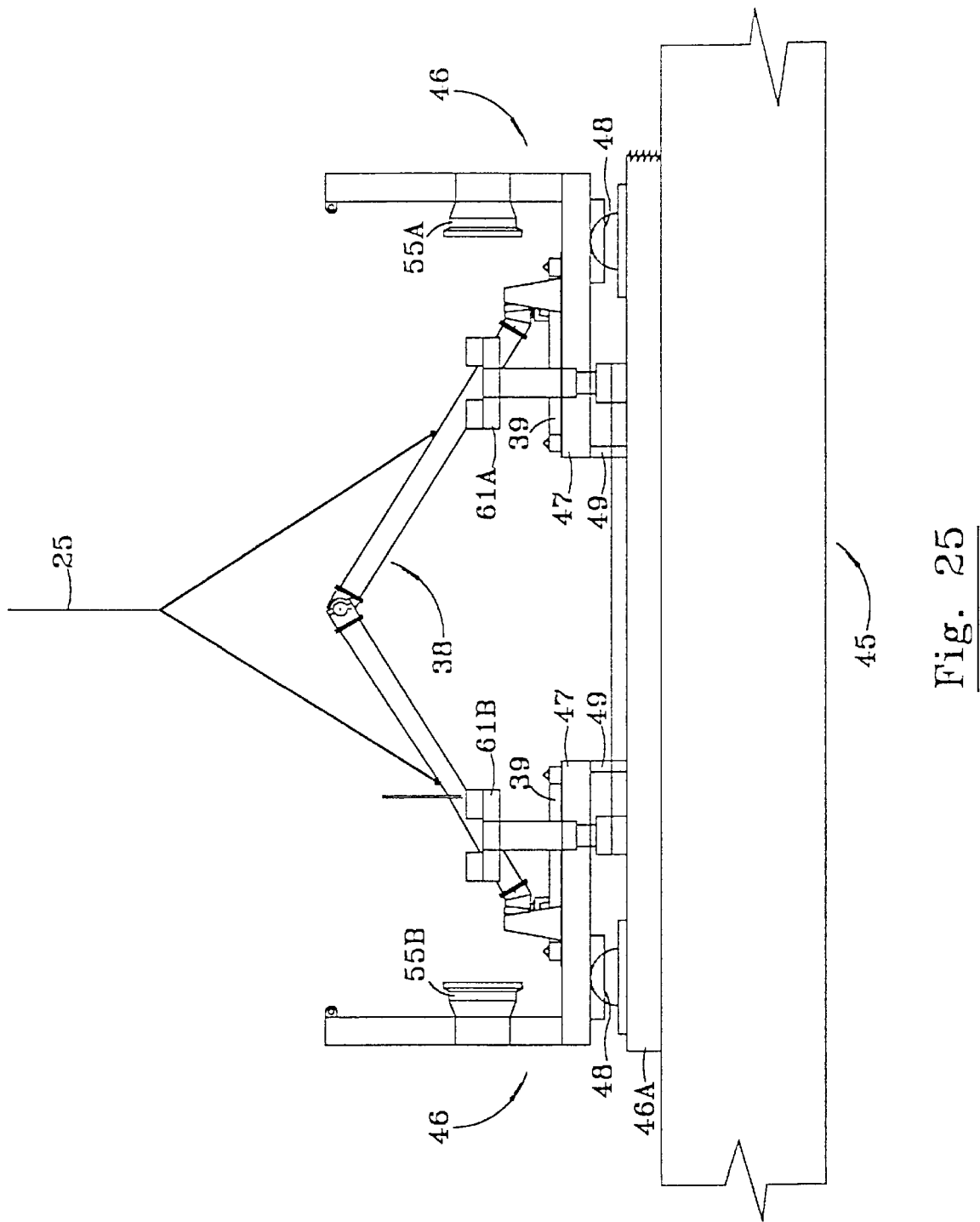
FIG. 25 is a side view of the adjustment and locking, on board the provided depot ship, of the mock up structure used for the connection system assembly, using the mechanical metrology module locked in the seabed measured configuration, in accordance to the preferred embodiment of the present invention.
Figure 37:
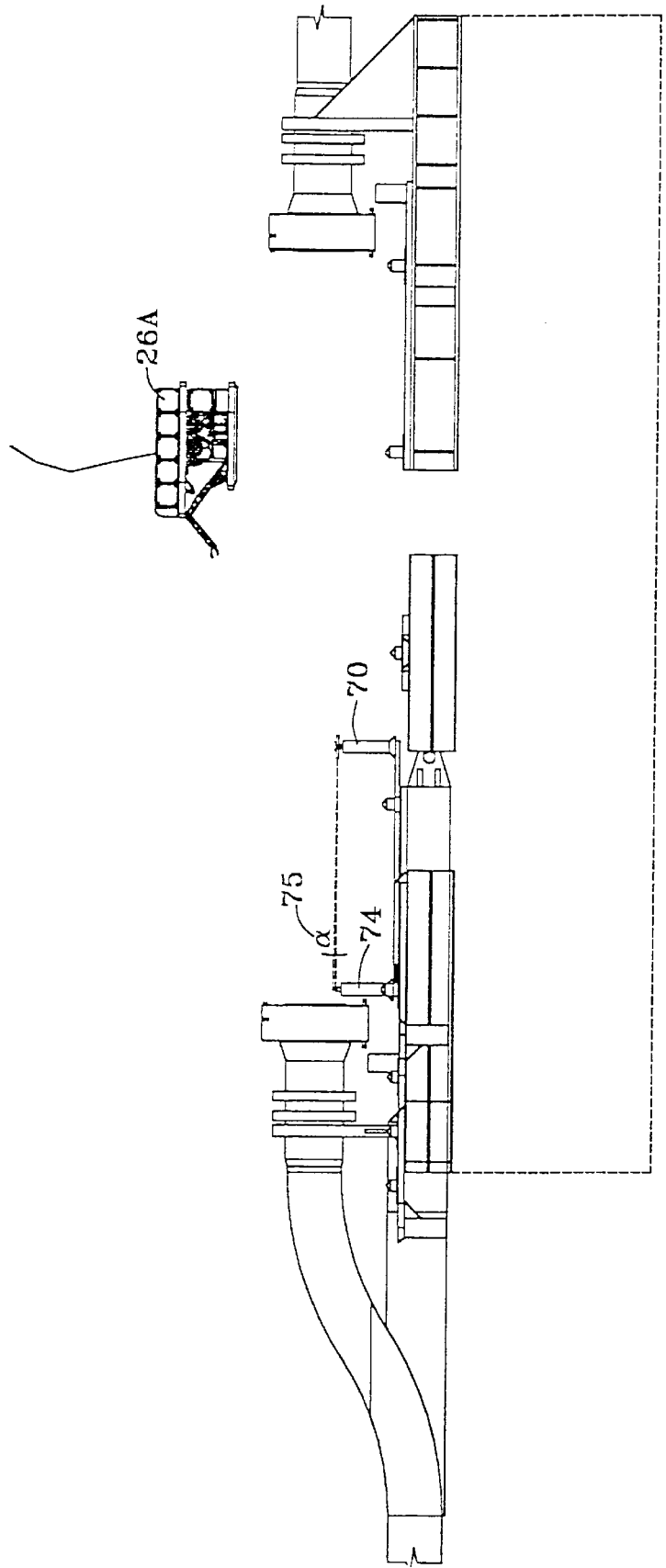
FIG. 37 is a side view of the acoustic measurement relevant to the definition of the installation skid misalignment in the vertical plane, in accordance to an alternative measurement system for the present invention.
Figure 38:
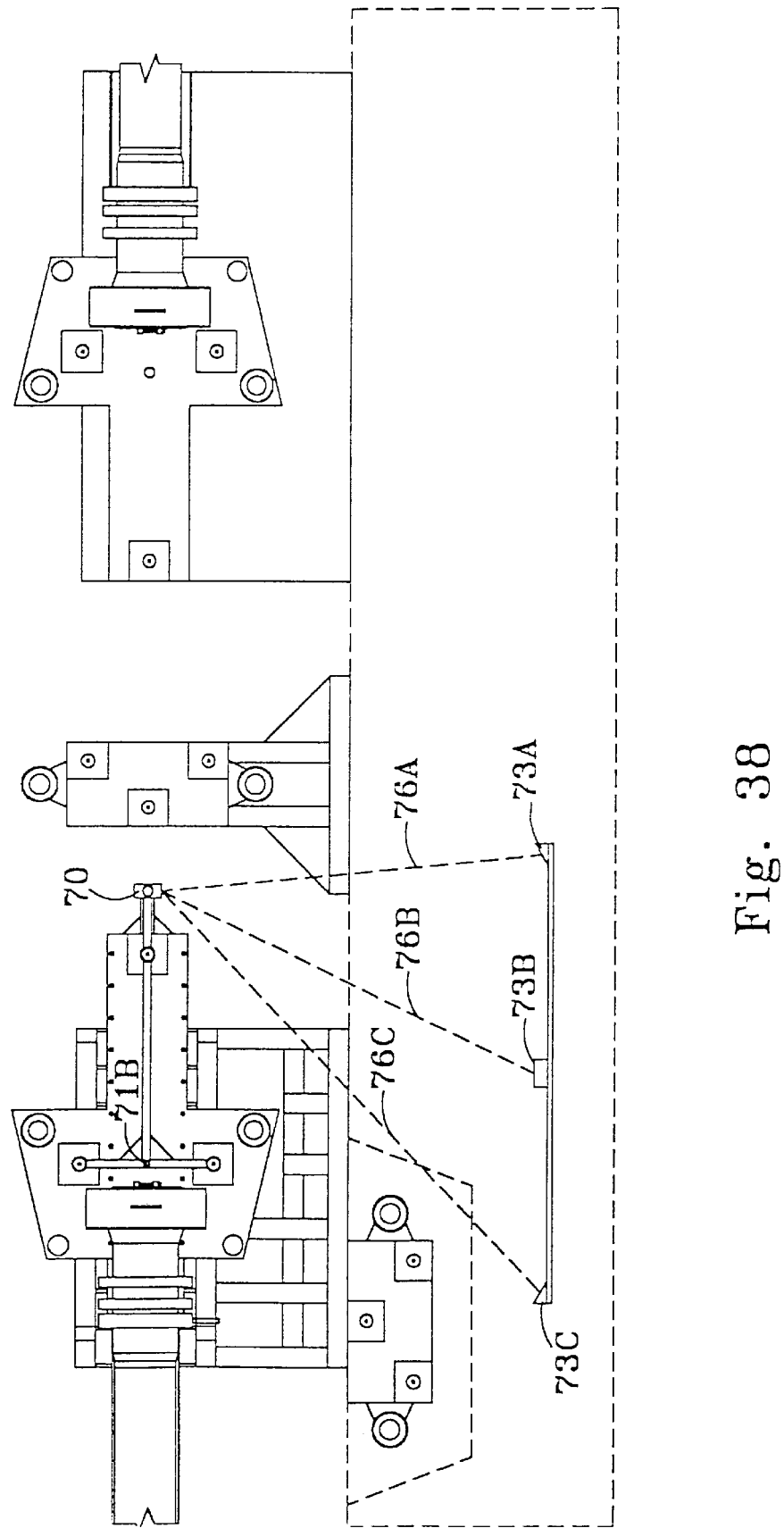
FIG. 38 is a plan view of the acoustic measurement relevant to the first step for the definition of the installation skid position with respect to the seabed fixed frame, in accordance to an alternative measurement system for the present invention.
Figure 39:
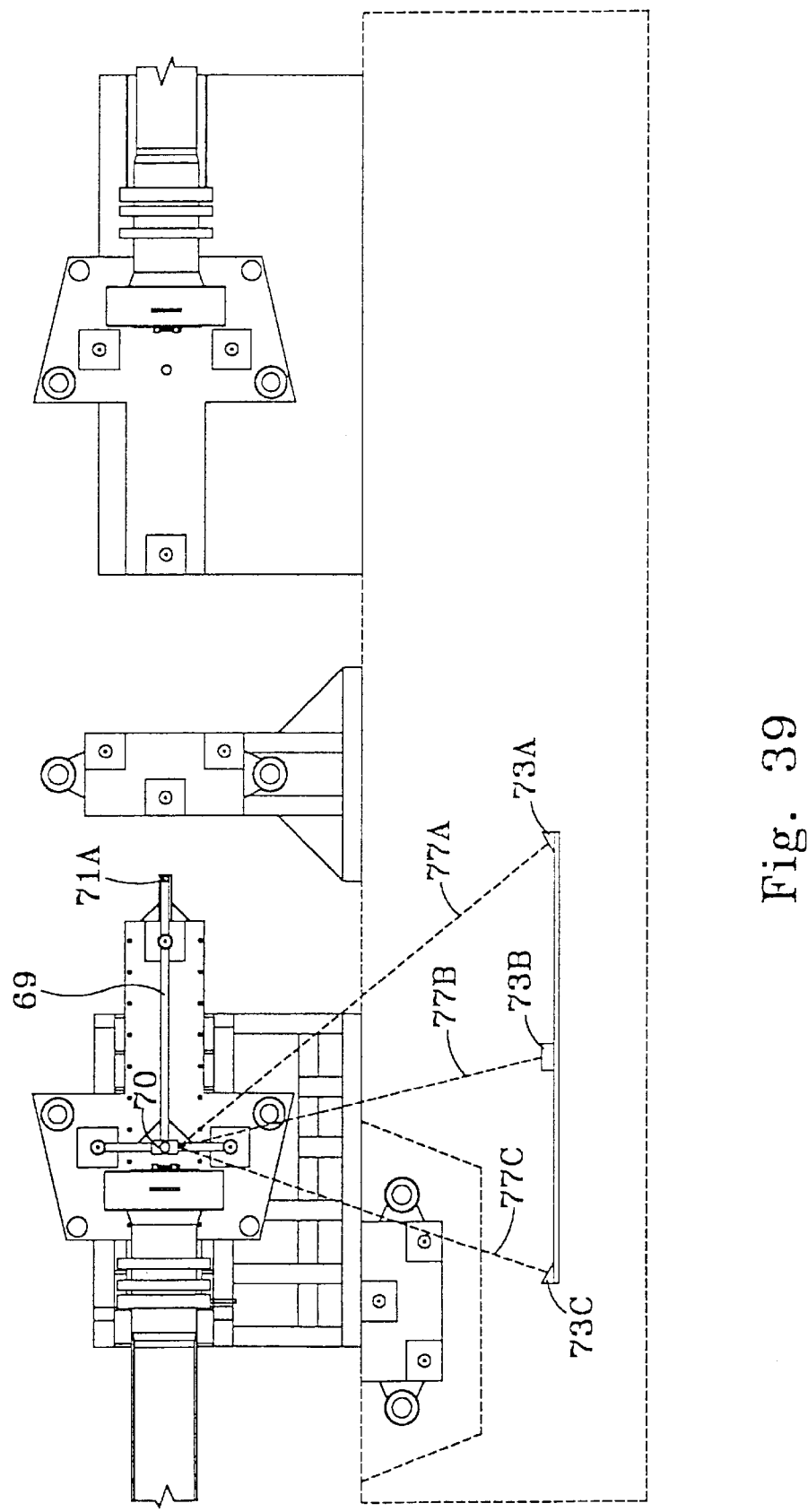
FIG. 39 is a plan view of the acoustic measurement relevant to the second, and last, step for the definition of the installation skid position with respect to the seabed fixed frame, in accordance to an alternative measurement system for the present invention.

Referring to FIGS. 24 and 25, the subsea measured layout is then recreated on board to serve as reference for the assembly of the connection system. The mechanical metrology module 38 is re-connected to the recovered installation plates 39 on the ship's deck 45 by actuating the latches (not shown) on the arms' ends 44. Using the on board crane wire 25, the mechanical metrology module 38 is then moved on the spool piece handling frame 46, located on the ship's deck 45, which will be used as reference frame for the connection system 50 (see FIG. 28) assembly. The spool piece handling frame 46 is composed by a support structure 46A carrying two moveable sections, each one including two sliding reference plates 47, similar to the ones located subsea i.e. the installation skid base plate 18C (see FIG. 7) and the inboard hub support frame base plate 3 (see FIG. 1), supported by two ball swivels 48. This layout allows a complete 5-degrees of freedom, excluding height regulation, for each reference plate 47, of course, if needed, the height regulation can be implemented by inserting an elevation cylinder supporting the said ball swivels 48. On each reference plate 47 is then installed a mock up 55A, 55B of the original hubs 68A, 68B (see FIG. 30) installed subsea. Two sliding supports 61A, 61B are also inserted to carry the connection system 50 (see FIG. 28) before fixing the said system 50 (see FIG. 28) to its installation plates 51 (see FIG. 26). The two reference plates 47 of the spool piece handling frame 46 are adjusted (distance and angular misalignment) to fit with the position of the mechanical metrology module installation plates 39. The reference position of the said plates 47 is then fixed by welding all the moveable sections of the plates 47 themselves, i.e. the ball swivels 48 and the sliding supports 49. The mechanical metrology module 38 is then removed at the end of the welding processes. As alternative to the use of the mechanical metrology module 38, FIGS. from 35 to 39 report the procedure in case of use of an acoustic system: the measurement procedure described hereinafter (see FIGS. 35 and 36) is performed by an acoustic system formed by a transponder unit 70, used as acoustic signal source and processing unit, installed on the a reference plate 69, provided by two docking cones 71A, 71B, and measuring the distance of the said docking cones 71A and 71B of the said reference plate 69 with respect to a reference a target unit 72 installed on a known position on the seabed fixed frame 1; the transponder unit 70 points, with a dedicated procedure, at three screens 73A, 73B, 73C installed on the said target unit 72 at known positions. Referring to FIGS. 35 and 36, the acoustic measurement system reference plate 69 is deployed by the on board crane wire 25 and installed on the installation skid 18. The docking and installation of the said reference plate 69 is aided by a remotely operated vehicle 26A carrying also the transponder unit 70; due to the low weight of the reference plate 69, its installation does not require guide posts 24A 24B (not shown). Referring now to FIG. 37, the transponder unit 70 is installed on the outer docking cone 71A (see FIG. 36) while on the inner docking cone 71B (see FIG. 36) has been installed a target unit 74 for the measurement of the installation skid's misalignment 75 in the vertical plane. The transponder unit 70 is first levelled with the horizontal plane by using internal sensors (not shown) and then pointed at the target unit 74 to measure the said installation skid's misalignment 75 in the vertical plane. The target unit 74 is then removed by the second remotely operated vehicle 26B (not shown). Referring to FIG. 38, the transponder unit 70 is pointed to each one of the three target screens 73A, 73B, 73C and the distances 76A, 76B, 76C relevant to each screen location from the transponder 70 position are taken. Referring to FIG. 38, the transponder unit 70 is moved from the outer docking cone 71A to the inner docking cone 71B (see FIG. 38), then the transponder unit 70 is pointed to each one of the three target screens 73A 73B 73C and the distances 77A 77B 77C relevant to each screen location from the transponder 70 position are taken. At the end of measurement, the reference plate 69 is recovered on board (not shown); with reference to FIG. 25, the two reference plates 47 of the spool piece handling frame 46 are adjusted (distance and angular misalignment) to fit with the measurement taken by the acoustic system. The reference position of the said plates 47 is then fixed by welding all the moveable sections of the plates 47 themselves, i.e. the ball swivels 48 and the sliding supports 49. Note that in this case, FIG. 25 has to be read without the mechanical metrology module 38 installed on the assembly frame 46.

Figure 26:
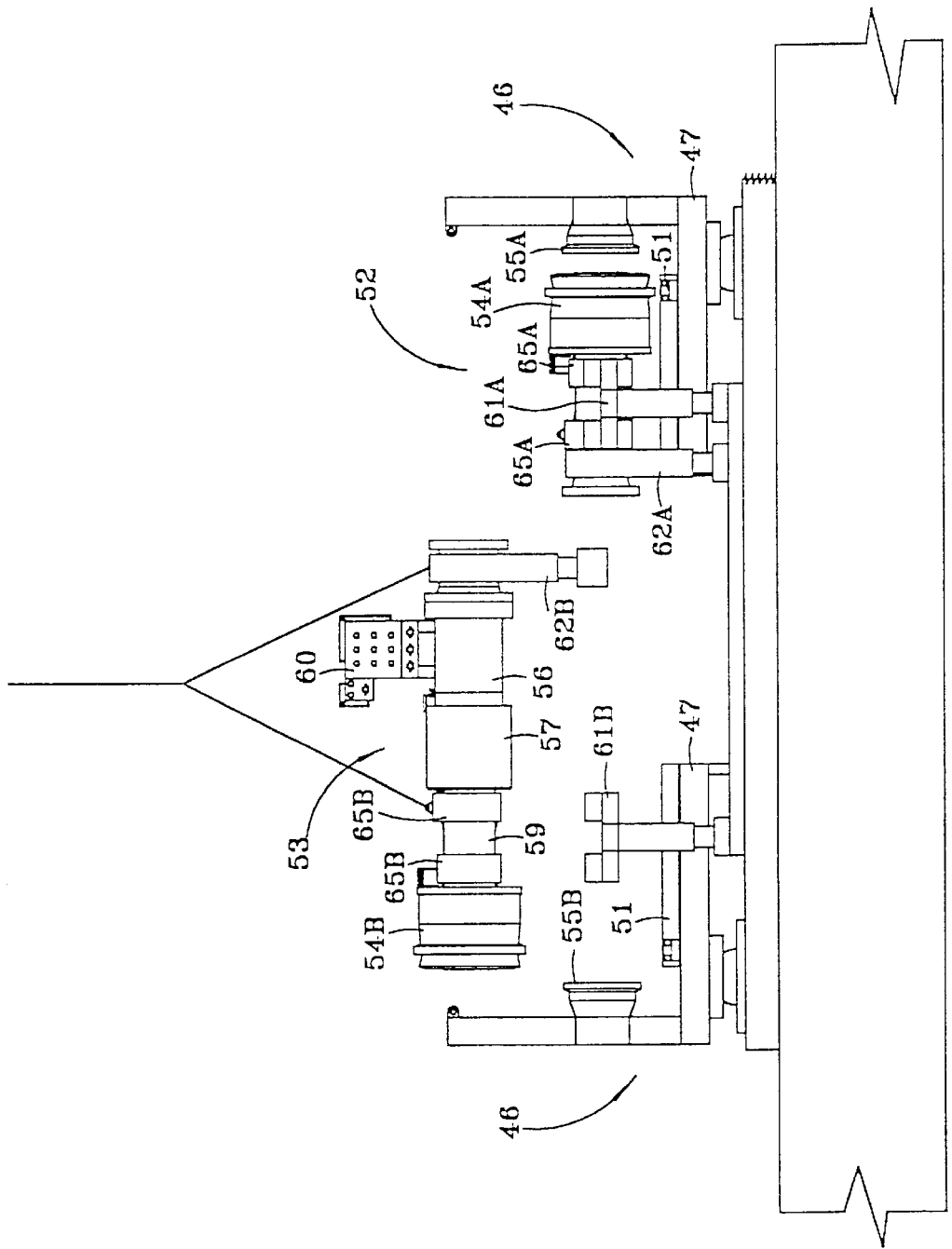
FIGS. 26 to 28 are side views of the connection system assembly operation, on board the depot ship, using the mock up structure, in accordance to the preferred embodiment of the present invention. In particular.
Figure 27:
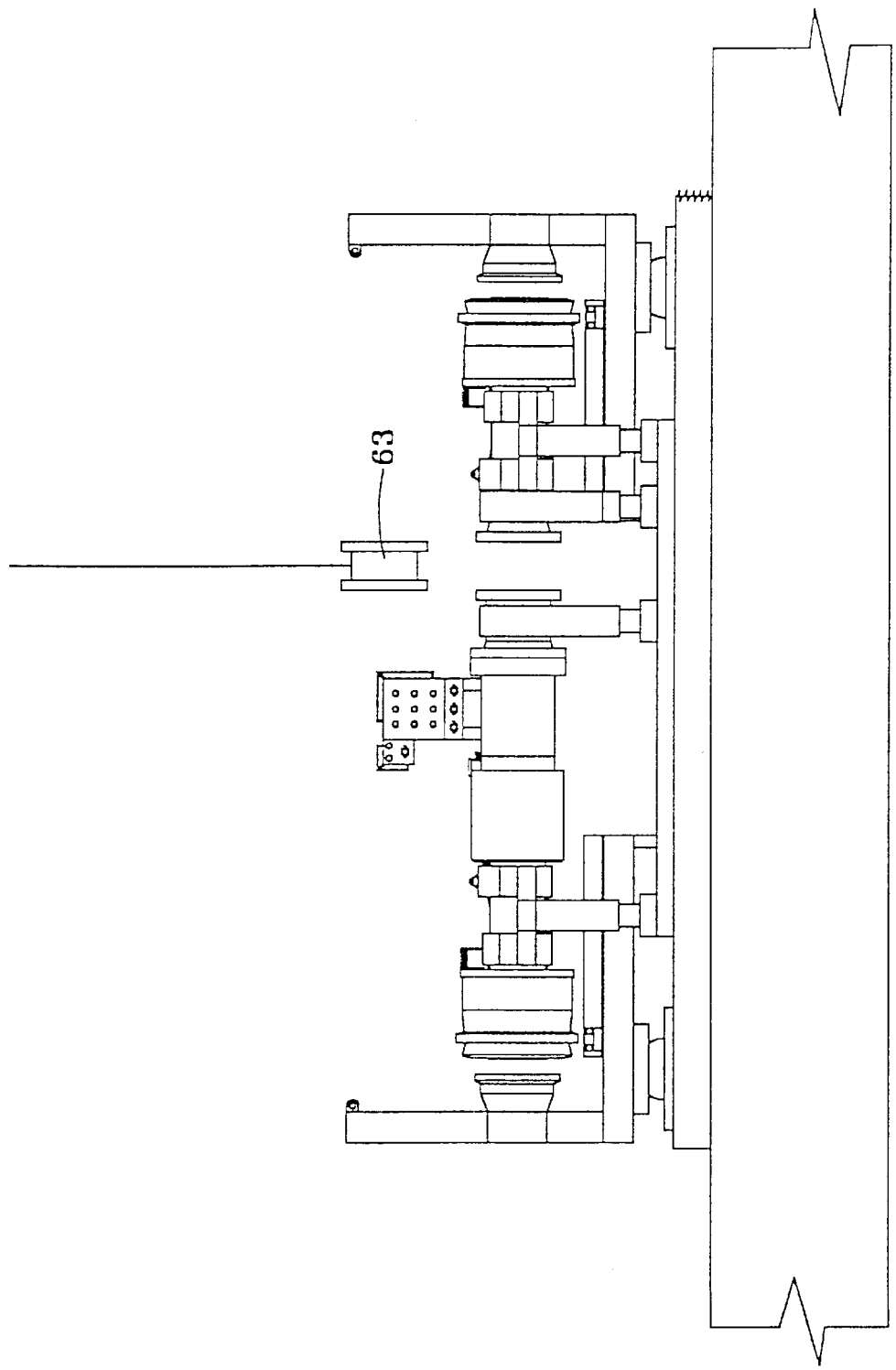

Referring to FIG. 26, the installation plates 51 of the connection system 50 (see FIG. 28) are installed on the reference plates 47 of the spool piece handling frame 46 previous fixed. The connection system 50 (see FIG. 28), besides the mentioned installation plates 51, is composed, in the preferred embodiment (see Norwegian patents no. 943283 and 942747 by Kongsberg Offshore A/S), mainly by two sections 52 and 53, to be connected by a suitable pipe adapter 63 (see FIG. 27) in order to have the right configuration with reference to the measured subsea layout. The said section 52 includes a mechanical connector 54A welded to a section of pipe 58, with the same characteristics of the subsea pipeline, carrying two support/centering collars 65A to allow system extension; the said section 53 includes a mechanical connector 54B welded to a section of pipe 59, with the same characteristics of the subsea pipeline, carrying two support/centering collars 65B to allow system extension, and integrate part of the telescopic joint 56, in turn including also the locking system 57. On the telescopic joint 57 is installed the dedicated panel 60, interface with the remotely operated vehicle. The two sections 52 and 53 of the connection system 50 (see FIG. 28) are installed on the spool piece handling frame 46 in such a way to have between the mechanical connectors 54A, 54B and the hubs mock up 55A, 55B the design clearance. In this phase both the mechanical connectors 54A, 54B and the telescopic joint 56 are in closed position, and the telescopic joint locking mechanism 57 is open. The two sections 52 and 53 are also provided by two sliding hydraulic cylinders 62A, 62B to allow precise regulation of the sections themselves. After this (see FIG. 27), the pipe adapter 63 is prepared and installed in the design position.

Figure 28:
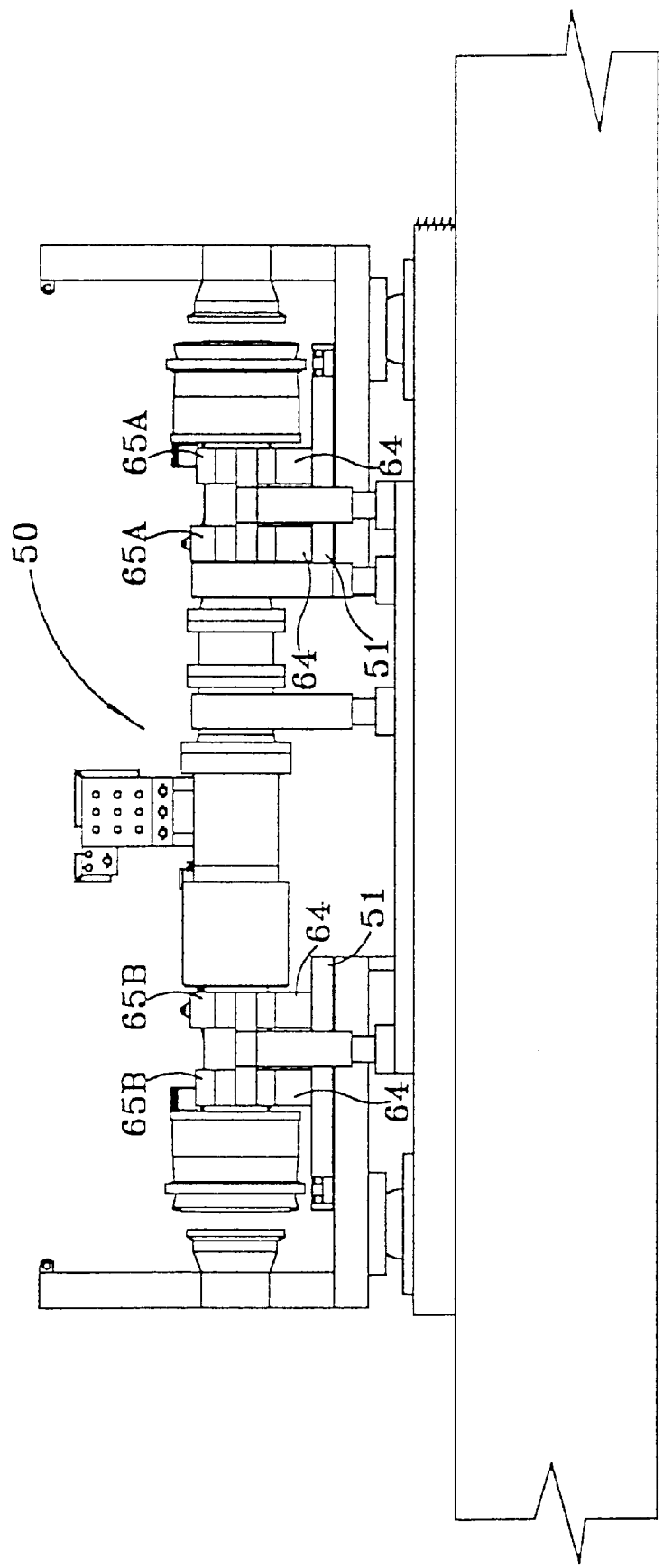
Figure 29:
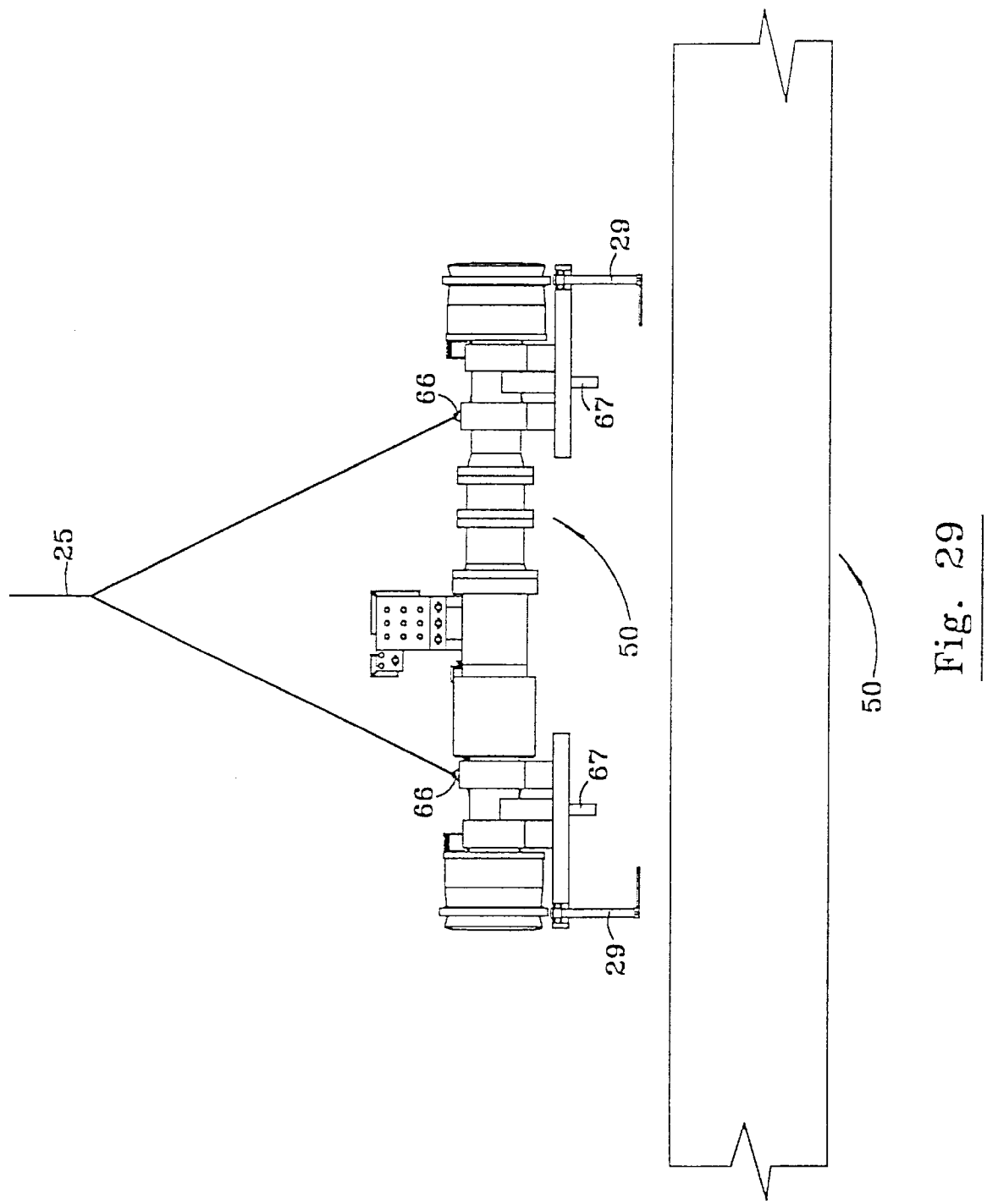
FIG. 29 is a side view of the connection system ready for the deployment, on board the provided support ship, including shock absorbers and centering rings for guidelineless installation, installed after connection system removal from the mock up structure, in accordance to the preferred embodiment of the present invention.
Figure 30:
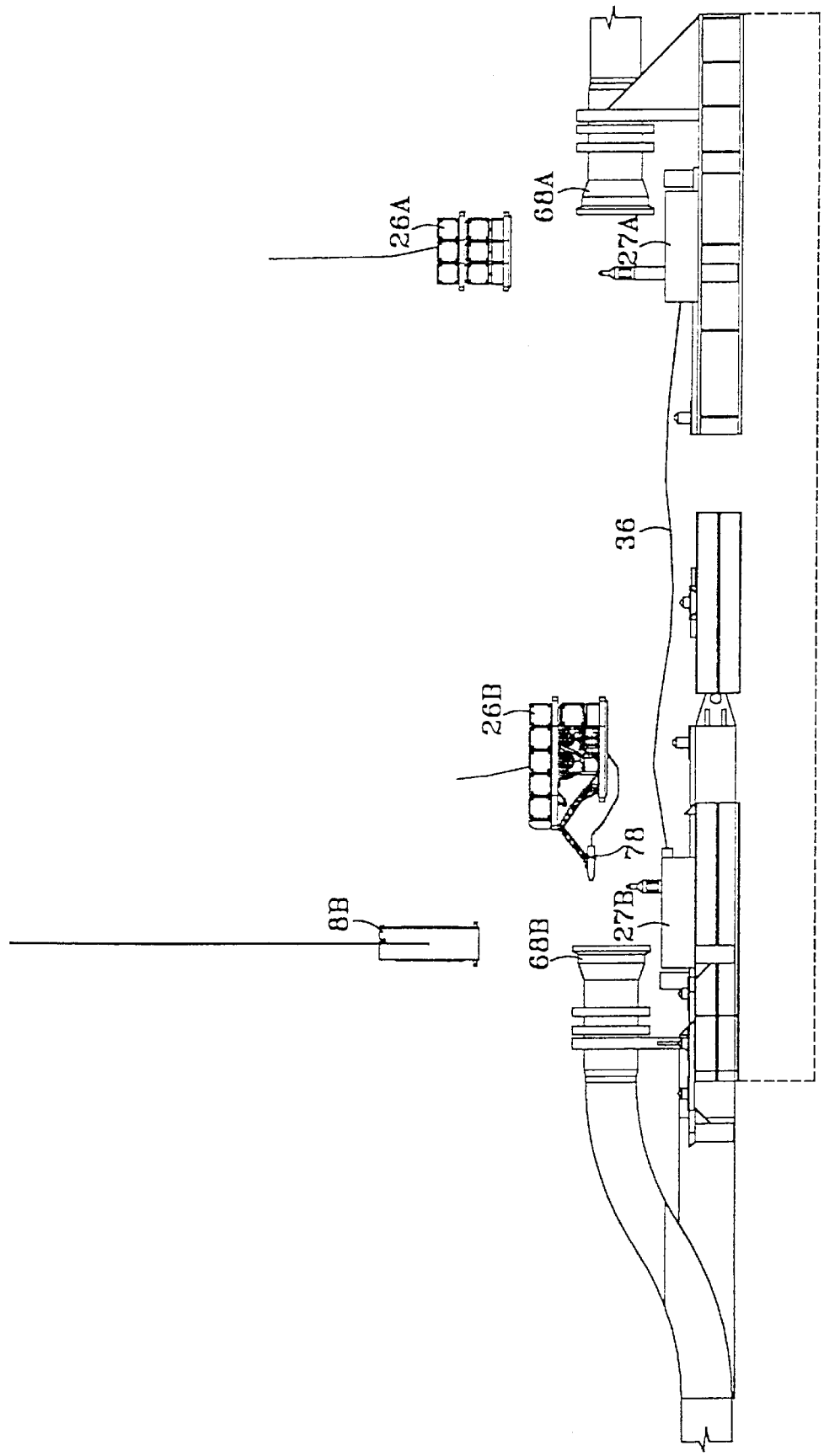
FIG. 30 is a side view of the protection caps removal and hubs inspection and cleaning operations carried out by remotely operated vehicle, in accordance to the preferred embodiment of the present invention.
Figure 31:
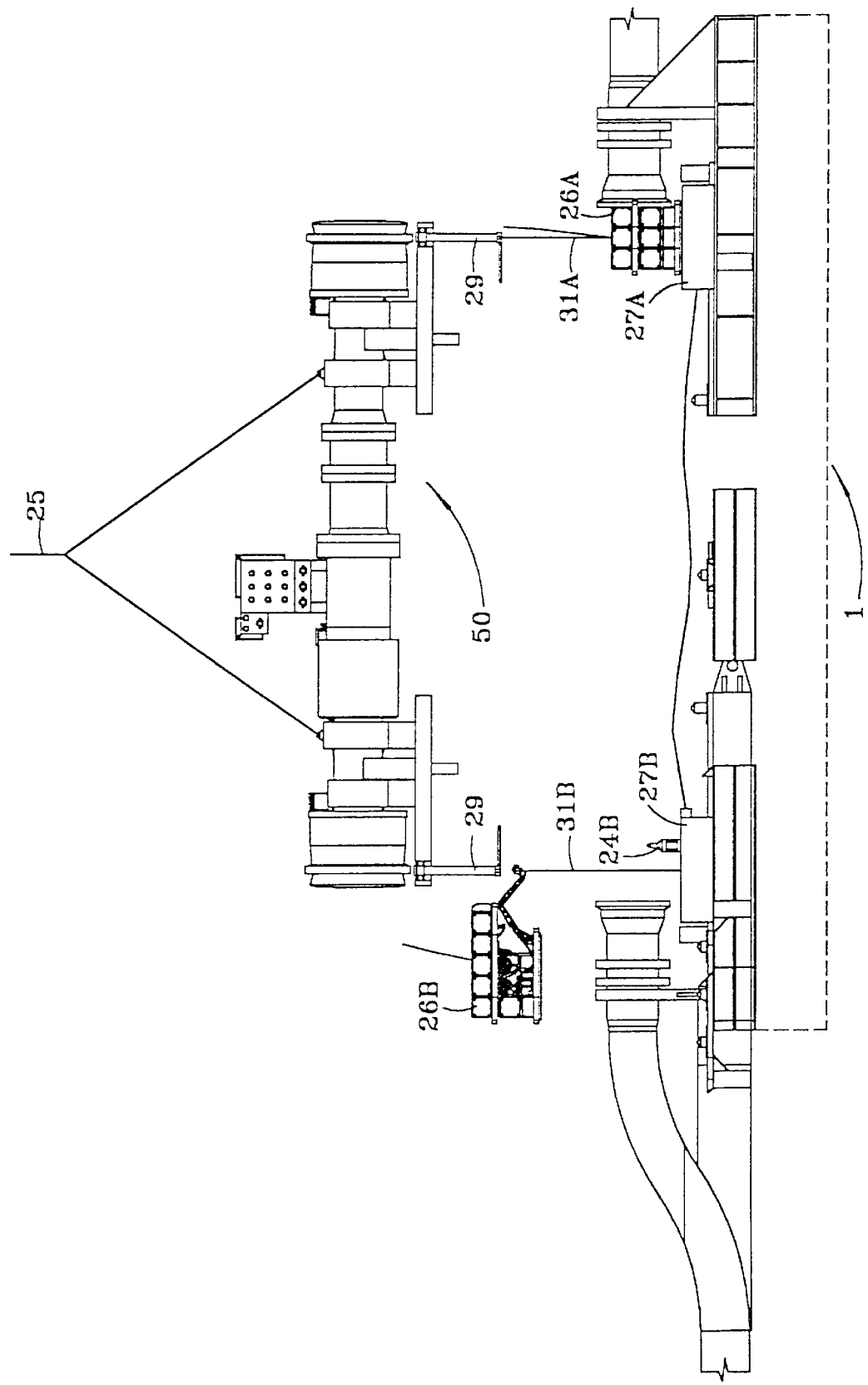
FIGS. 31 to 33 are side views of the installation and operation of the connection system, in accordance to the preferred embodiment of the present invention. In particular.
Figure 32:
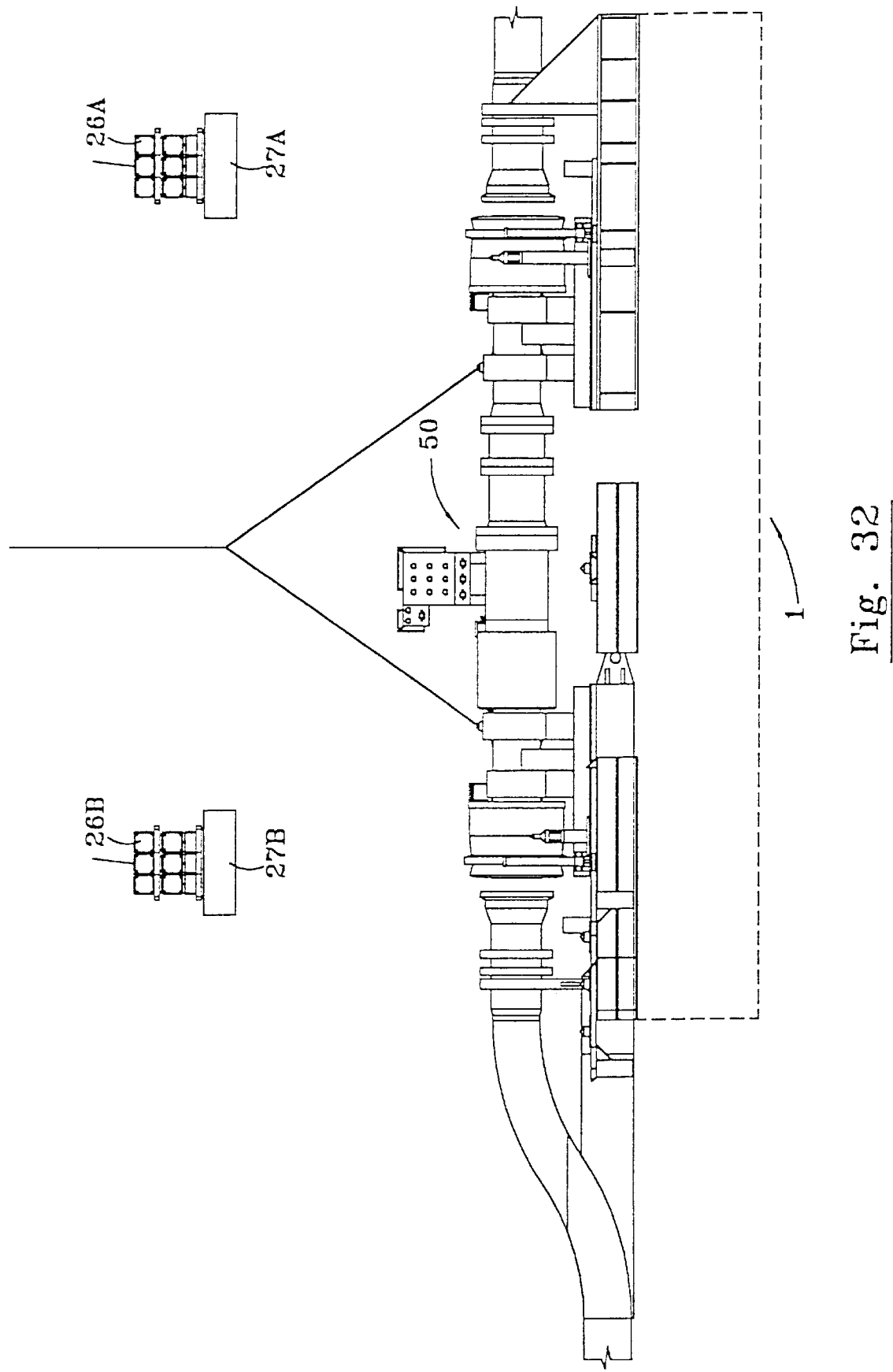
Figure 33:
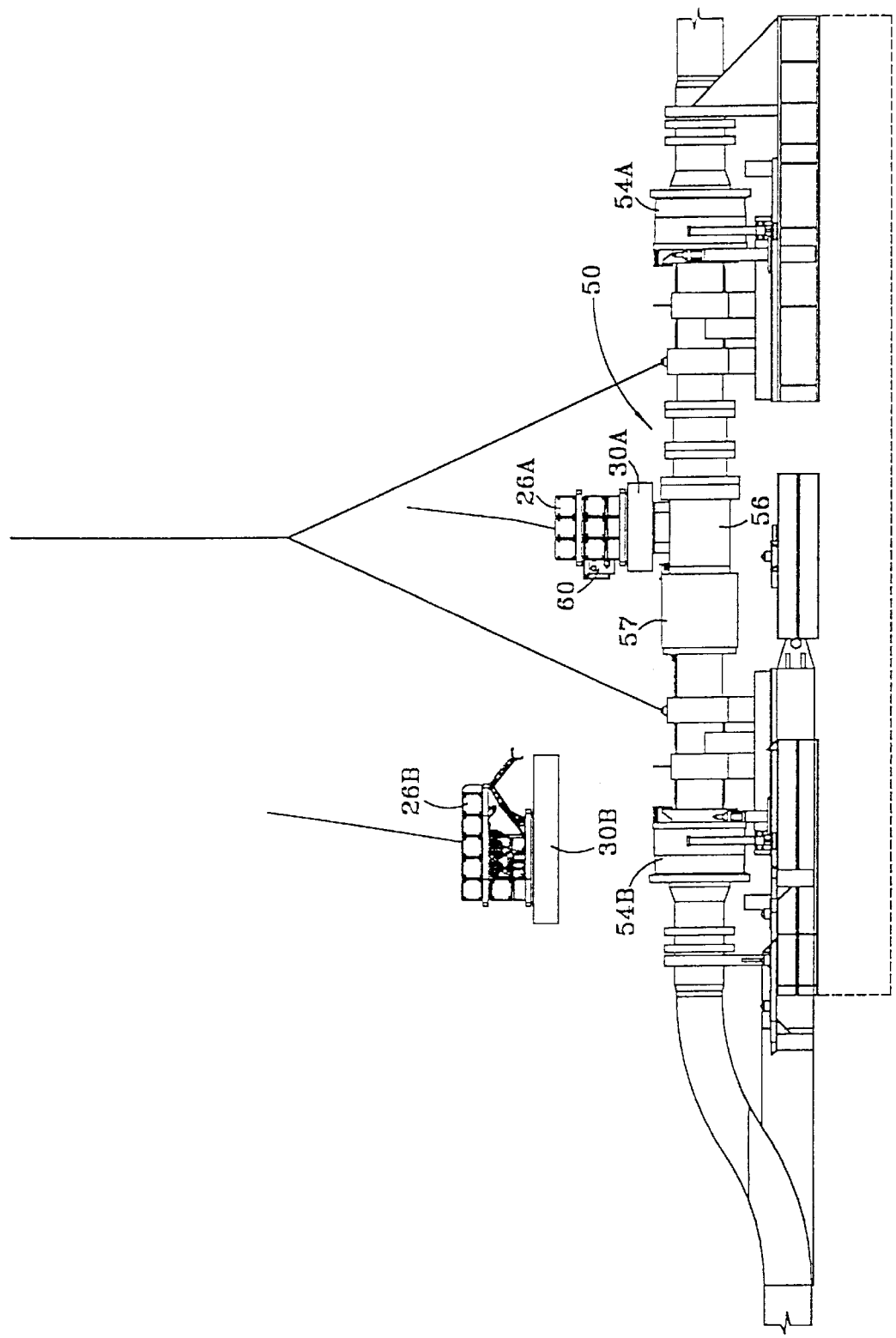
Figure 34:
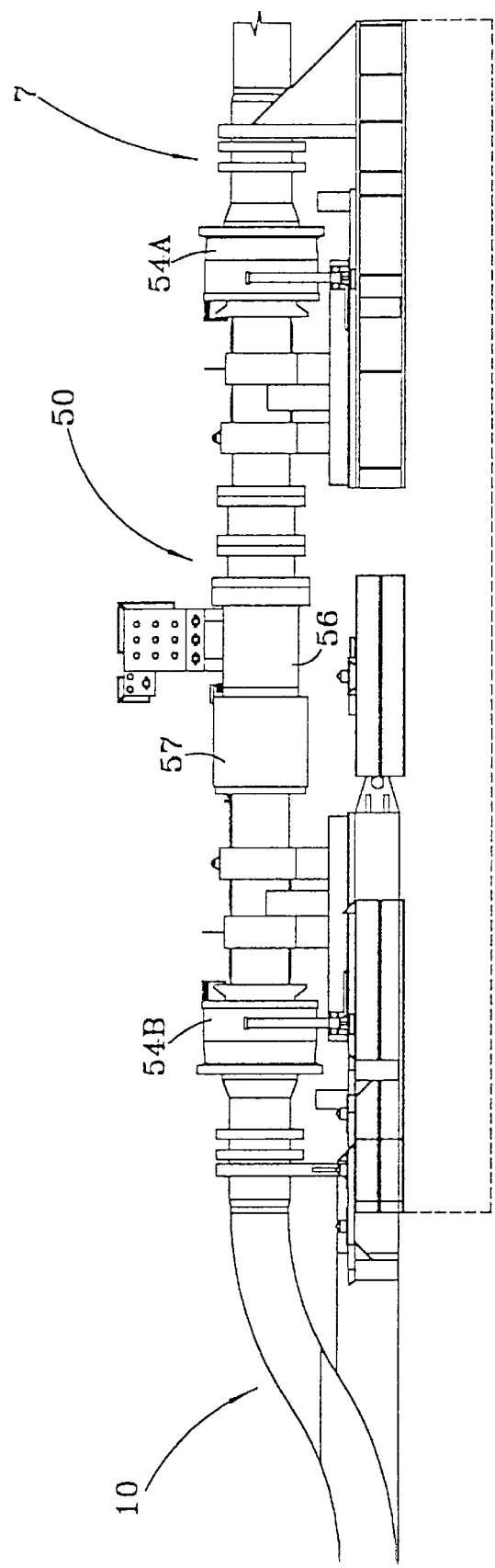
FIG. 34, at last, is a side view of the final configuration of the system installed at the end of the whole procedure, in accordance to the preferred embodiment of the present invention.

Referring now to FIG. 28, the connection system 50 is then tested and the support/centering collars 65A, 65B are connected to the relevant installation plates 51 by inserting and welding dedicated support cradles 64. The on board crane wire 25 is connected to the connection system lifting points 66 (see FIG. 29), then the connection system 50 is lifted and maintained suspended on the ship's deck 45 while shock absorbers 67 and centering rings 29 are installed. Referring to FIG. 30, while the said connection system 50 (see FIG. 29) assembly is being performed, the two protection caps 8A (not shown) and 8B are removed and recovered and the two hubs 68A, 68B are cleaned by the remotely operated vehicle 26B provided with a water jetting cleaning tool 78; in the mean time the second remotely operated vehicle 26A is deployed and connected to the small subsea winch 27A, still connected to the other winch 27B through the hydraulic flexible hose 36. The connection system 50 is deployed (see FIG. 31), deployment operation shall stop at least 5 m above the subsea structure 1. The remotely operated vehicle 26B connects both the small winch cables 31A and 31B to the centering rings 29 of the connection system 50. Both the small subsea winches 27A and 27B are then actuated at the same time by the remotely operated vehicle 26A, while the connection system 50 is gently lowered by the on board crane wire 25. This operation is performed until the centering rings 29 engage both the guide posts 24A and 24B. Then the small subsea winches' cables 31A and 31B are released and the connection system 50 is lowered in the final position (see FIG. 32) on the subsea structure 1. Both subsea small winches 27A 27B are recovered on board by the remotely operated vehicles 26A, 26B. Referring now to FIG. 33, the first remotely operated vehicle 26A is launched, provided with the dedicated interface skid 30A, and stabs in the panel 60 installed on the connection system 50. The second remotely operated vehicle 26B is launched provided with the other interface skid 30B in order to substitute the first vehicle 26A, if required during any step of the following operations. The first remotely operated vehicle 26A provides hydraulic power to extend the telescopic joint 56. While maintaining pressure inside the said telescopic joint, the said remotely operated vehicle 26A closes the connectors 57A and 57B; the seal tests on both the connectors are then carried out with standard procedure (not described). The said remotely operated vehicle 26A, then, actuates the telescopic joint locking mechanism 57, and energizes the internal gasket (not shown) to seal the whole system. At last the seal test of the gasket itself is carried out with standard procedure (not described). FIG. 34 shows the final layout of the system at the end of the installation procedure; the connection system 50 connects the outboard section of the pipeline 10 with the inboard one 7 through the two mechanical connectors 57A and 57B closed onto the outboard and inboard pipeline hubs 68B, 68A (not shown—see FIG. 30). The telescopic joint 57 of the connection system 50 is locked, to prevent any movement due to pipeline expansion/retraction force in operating conditions, by the telescopic joint locking mechanism 58.

We claim:

1. A method for connecting underwater pipelines of large diameters at great depths by using a crane equipped support ship and remotely operated vehicles for seabed work and assistance, the method comprising the steps of:

installing an inboard pipeline having a non-connected end on a seabed fixed frame;

mounting a non-connected end of an outboard pipeline on an installation skid;

mounting atop the outboard pipeline buoyancy tanks having attached drag chains;

laying the installation skid so that the non-connected end of the outboard pipeline and the installation skid are in a defined lay-down area;

installing a metrology system intermediate the end of the inboard pipeline and the end of the outboard pipeline to determine subsea layout measurements of the distance and angular misalignment between the two pipeline ends;

using the subsea layout measurements of the metrology system, assembling, upon a dedicated handling frame mounted on board the support ship, a connection system with telescopic capabilities, the connection system being designed and constructed for connecting together the two pipeline ends;

installing the connection system on the seabed fixed frame; and connecting an end of the connection system with each of the pipeline ends to connect the two underwater pipelines.

2. The method of claim 1, comprising the further steps of:

laying of a portion of the outboard pipeline prior to mounting a non-connected end of the outboard pipeline on an installation skid;

attaching the non-connected end of the outboard pipeline to a winch for the step of mounting the pipeline end on the installation skid; and using the winch to lay the outboard pipeline and to place the installation skid in the defined lay down area.

3. The method of claim 1, comprising the further steps of:

laying the outboard pipe from a lay barge having plural tensioners;

stopping the laying of the outboard pipe when a last bar of the outboard pipe approaches a first of the plural tensioners;

welding a lower section of the installation skid on the last bar of the outboard pipeline;

while the tensioners are maintained at tension, attaching a laying cable connected to a laying winch to the lower section of the installation skid;

after releasing and opening the tensioners, passing the lower section of the installation skid through the tensioners;

installing an upper section of the installation skid by bringing the upper section into position over the lower section with an onboard crane and welding the upper and lower sections together;

subsequent to welding the upper and lower sections together, completing the step of mounting atop the outboard pipeline buoyancy tanks having attached drag chains;

mounting an acoustic transponder to one of the buoyancy tanks;

resuming the laying procedure of the outboard pipeline until the installation skid exits a stringer of the lay barge;

installing a base plate on the installation skid after bringing the base plate into position with a crane and bolting the base plate to a dedicated location of the installation skid; and proceeding with the step of laying the installation skid so that the non-connected end of the outboard pipeline and the installation skid are in the defined lay down area.

4. The method of claim 1, comprising, between the steps of mounting atop the outboard pipeline buoyancy tanks having attached drag chains and installing the metrology system, the further steps of:

laying the outboard pipeline on the sea bottom;

lifting of the outboard pipeline by bringing the drag chains from the buoyancy tanks to the sea bottom;

using the onboard crane, installing a subsea winch on guide pins located on the seabed fixed frame;

locking the subsea winch on the guide pins through hydraulic latches;

connecting a first remotely operated vehicle to the subsea winch and actuating the subsea winch by the first remotely operated vehicle to unwind a cable of the subsea winch;

using a second remotely operated vehicle, bringing and connecting an end of the cable form the subsea winch to the outboard pipeline;

winding the cable from the subsea winch to deflect the outboard pipeline to a connection area provided at the seabed fixed frame; and lowering of the outboard pipeline on the seabed fixed frame by releasing the buoyancy tanks and drag chains from the outboard pipeline.

5. The method of claim 4, wherein the step of installing the subsea winch comprises the steps of:

providing the subsea winch with sliding centering rings for guiding the installation;

docking and installing two guide posts, one shorter than the other, by using the onboard crane wire and one of the remotely operated vehicles, to bring the guide posts into dedicated guide post receptacles on a base plate located on the seabed fixed frame;

installing a small subsea winch on the seabed fixed frame using one of the remotely operated vehicles, the installing of the small subsea winch providing a hydraulic power supply;

stopping the deployment of the subsea winch at least 5 meters above the seabed fixed frame;

connecting the cable of the small subsea winch to one of the centering rings;

actuating the small subsea winch while the subsea winch is gently lowered by the onboard winch crane until the centering rings engage both the guide posts;

releasing the cable of the small subsea winch;

completing the installation of the subsea winch in a final position.

6. The method of claim 4, wherein the installation of the subsea winch is performed using guide lines.

7. The method of claim 4, wherein the buoyancy tanks are recovered by the steps of:

deployment of a clump weight connected to an assembly;

attaching the assembly to one of the buoyancy tanks;

detaching the buoyancy tank from the pipeline; and floating up to the surface the buoyancy tank and the clump weight.

8. The method of claim 1, wherein the metrology system is a mechanical one.

9. The method of claim 8, wherein said step of installing the metrology system utilizes a mechanical metrology system formed by connecting two arms through a hinge, each arm being provided at an extremity with a ball joint and a releasable hydraulic latch to an installation plate provided with a centering funnel;

using the centering funnel to aid and ease the installation of the metrology system by aligning the funnel with guide posts located on the seabed fixed frame; and using a remotely operated vehicle to operate locks on the hinge and ball joints.

10. The method of claim 1, wherein the distance and angular misalignment between the ends of the two pipelines are determined by the steps of:

deploying and installing a mechanical metrology system on installation plates with moveable sections of the mechanical metrology system each being in an unlocked position during the installation step;

actuating by a remotely operated vehicle a hydraulic circuit that freezes the mechanical metrology system in a fixed configuration;

releasing the mechanical metrology system from the installation plates while maintaining the fixed configuration;

recovering the mechanical metrology system; and recovering the installation plates separately from recovering the mechanical metrology system.

11. The method of claim 1, wherein the installation of metrology system comprises the steps of:

installing subsea winches at defined positions on the seabed fixed frame;

connecting by a remotely operated vehicle wires of the subsea winches to installation plates of a mechanical metrology system;

using the subsea winches to direct the mechanical metrology system, lowering the mechanical metrology system by the onboard crane; and stopping the subsea winches when guides located on the mechanical metrology system engage guide posts installed on the seabed fixed frame.

12. The method of claim 1, wherein the installation of the metrology system is performed using guide lines.

13. The method of claim 1, wherein an acoustic metrology system is installed.

14. The method of claim 13, wherein the acoustic metrology system is assembled by using a transponder unit as an acoustic signal source and as a processing unit;

installing the transponder unit on a reference plate located in fixed proximity to two docking cones;

and measuring the distance from the docking cones with respect to a reference target unit installed on a known position on one of the subsea fixed frame and an end of the inboard pipeline.

15. The method of claim 13, wherein the distance and angular misalignment between the ends of the two pipelines are determined by the steps of:

deploying the reference plate of the acoustic metrology system by the on board crane wire and installing the reference plate on the installation skid aided by a remotely operated vehicle;

installation of the transponder unit on an outer docking cone;

installation of the target unit on an inner docking cone for measuring vertical misalignment of the installation skid;

levelling of the transponder unit with respect to the horizontal plane and pointing to the target unit to measure the misalignment with respect to the vertical plane of the installation skid;

removal of the target unit by a remotely operated vehicle and pointing the transponder unit to each one of three screens mounted on the seabed fixed frame to acquire a distance of each screen with respect to the transponder unit; and moving the transponder unit from the outer docking cone to the inner docking cone and pointing the transponder unit to each one of the three screens to acquire a distance of each screen with respect to the transponder unit.

16. The method of claim 8, wherein the support ship assembly of the connection system comprises the steps of:

installing the mechanical metrology system on an assembly frame installed on the support ship, the assembly frame comprising a support structure carrying two moveable sections, each moveable section including two sliding reference plates supported by a ball joint, each reference plate comprising a mock-up of hubs installed on the two pipeline ends;

adjusting the two reference plates of the assembly frame to fit to the position of the installation plate of the mechanical metrology system;

locking the configuration of the reference plates through welding of all moveable sections;

removing the mechanical metrology system;

installing installation plates of the connection system on the reference plates of the assembly frame;

connecting to the installation plate two sections, the first section comprising a mechanical connector welded to a pipeline section with the same characteristics of one of the two pipelines and carrying two support/centering collars to allow system extension, the second section including a mechanical connector welded to a pipeline section with the same characteristics of the other of the two pipelines and carrying two support/centering collars to allow system extension and including a telescopic joint and a locking system, the connecting being accomplished to duplicate the measured distance and misalignment;

preparing and assembling between the two sections a pipe piece to obtain the final length connection system; and installing support cradles, shock absorbers, and centering rings to the connection system.

17. The method of claim 14, wherein the adjustment of the assembly frame is based on measurements acquired by an acoustic measurement system.

18. The method of claim 1, wherein the installation of the connection system comprises the following steps:

connecting, by a remotely controlled vehicle, wires of subsea winches from defined positions on the seabed fixed frame to centering rings mounted on installation plates of the connection system;

actuating the subsea winches to control the wires while lowering by the on board crane the connection system toward the seabed fixed frame;

guiding the centering rings to engage guide posts installed on the seabed fixed frame;

following engagement of the centering rings with the guide posts, releasing the wires of the subsea winches; and lowering the connection system into final position.

19. The method of claim 1, wherein the installation of the connection system uses guide lines.

20. The method of claim 1, wherein the connection of the connection system with the ends of the two pipelines comprises the steps of:

using a remotely operated vehicle to provide hydraulic power to extend a telescopic joint of the connection system and to maintain pressure inside of the telescopic joint to close mechanical connectors of the connection system;

performing sealing tests on the mechanical connectors; and using the remotely operated vehicle to actuate a locking system of the telescopic joint and energize an internal gasket to seal the connected two pipelines and connection system.

21. The method of claim 1, comprising the further step of providing control by visual indicators mounted on components of the system and monitored by an underwater camera mounted on a remotely operated vehicle, wherein the indicators include one of:

an indicator of contact between surfaces to monitor the installation of components to the seabed fixed frame, the contact indicator being of the form of a pin kept in position by a return spring, once surface contact is made, the pin is pushed outside making visible a painted section of the pin;

an indicator of hydraulic cylinder status, the status indicator being of the form of a double rod with a painted status section;

a pressure indicator to monitor hydraulic component status, the pressure indicator being a pressure gauge;

a mechanical revolution to monitor the length of the subsea winch cable released from the winch; and a bar indicator to monitor the status of mechanical connectors of the telescopic joint.

22. The method of claim 1, further comprising the step of monitoring through electronic sensors mounted on components of the system and linked to a control unit located on the support ship through a dedicated cable of a remotely operated vehicle.

23. The method of claim 1, wherein the step of assembling a connection system comprises the step of:

assembling two connectors with a telescopic section.

24. The method of claim 1, wherein the step of assembling a connection system comprises the step of providing mechanical connectors and a telescopic joint which may be actuated by mechanical or hydraulic tools both internal and external to the connection system.

25. The method of claim 1, comprising the further step of deflecting the outboard pipeline by a subsea winch located separate from the seabed fixed frame.

26. A method for connecting underwater pipelines of large diameters at great depths by using a crane equipped support ship and remotely operated vehicles for seabed work and assistance, the method comprising the steps of:

installing an inboard pipeline having a non-connected end on a seabed fixed frame;

assembling a connection system with telescopic capabilities, the connection system being designed and constructed for connecting together two pipeline ends;

installing a connection system on the seabed fixed frame;

mounting a non-connected end of an outboard pipeline on an installation skid;

mounting atop the outboard pipeline buoyancy tanks having attached drag chains;

laying the installation skid so that the non-connected end of the outboard pipeline and the installation skid are in a defined lay down area;

connecting an end of the connection system with the non-connected end of the outboard pipeline.

27. A method for connecting underwater pipelines of large diameters at great depths by using a crane equipped support ship and remotely operated vehicles for seabed work and assistance, the method comprising the steps of:

installing an inboard pipeline having a non-connected end on a seabed fixed frame;

mounting a non-connected end of an outboard pipeline on an installation skid;

mounting atop the outboard pipeline buoyancy tanks having attached drag chains;

laying the installation skid so that the non-connected end of the outboard pipeline and the installation skid are on the seabed fixed frame;

assembling, upon a dedicated handling frame mounted on board the support ship, a connection system with telescopic capabilities, the connection system being designed and constructed for connecting together the two pipeline ends;

installing the connection system on the seabed fixed frame; and connecting an end of the connection system with each of the pipeline ends to connect the two underwater pipelines.

* * * * *